| (12) | United States Patent | (10) Patent No.: US 11,518,399 B2 |
|---|---|---|
| | Wagatsuma et al. | (45) Date of Patent: Dec. 6, 2022 |

(54) AGENT DEVICE, AGENT SYSTEM, METHOD FOR CONTROLLING AGENT DEVICE, AND STORAGE MEDIUM

(71) Applicant: HONDA MOTOR CO., LTD., Tokyo (JP)

(72) Inventors: Yoshifumi Wagatsuma, Wako (JP); Kengo Naiki, Wako (JP); Yusuke Oi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 296 days.

(21) Appl. No.: 16/828,995

(22) Filed: Mar. 25, 2020

(65) Prior Publication Data

US 2020/0307620 A1 Oct. 1, 2020

(30) Foreign Application Priority Data

Mar. 27, 2019 (JP) .............................. JP2019-060021

(51) Int. Cl.
  *B60W 50/14* (2020.01)
  *B60W 40/08* (2012.01)
  *G10L 15/22* (2006.01)

(52) U.S. Cl.
  CPC ............ *B60W 50/14* (2013.01); *B60W 40/08* (2013.01); *G10L 15/22* (2013.01); *B60W 2050/146* (2013.01); *G10L 2015/223* (2013.01)

(58) Field of Classification Search
  CPC ................. B60W 50/14; B60W 40/08; B60W 2050/146; G10L 15/22; G10L 2015/223; G10L 25/51; G10L 13/027; G10L 15/1822; G10L 25/21; G10L 25/78; G10L 2015/088; G10L 15/30; G10L 2015/225; H04W 4/44

See application file for complete search history.

(56) References Cited

U.S. PATENT DOCUMENTS

| 5,890,122 A * | 3/1999 | Van Kleeck ............ G10L 15/26 |
|---|---|---|
| | | 704/E15.044 |
| 7,392,194 B2 * | 6/2008 | Tanaka .................... G10L 15/22 |
| | | 704/E15.04 |

(Continued)

FOREIGN PATENT DOCUMENTS

| JP | 2006-154926 | 6/2006 |
|---|---|---|
| JP | 2006-195578 | 7/2006 |

(Continued)

OTHER PUBLICATIONS

Japanese Notice of Allowance for Japanese Patent Application No. 2019-060021 dated Oct. 11, 2022.

*Primary Examiner* — John A Tweel, Jr.
(74) *Attorney, Agent, or Firm* — Amin, Turocy & Watson, LLP

(57) ABSTRACT

An agent device includes a display controller configured to cause a first display to display an agent image when an agent providing a service including causing an output device to output response of voice in response to an utterance of a user is activated, and a controller configured to execute particular control for causing a second display to display the agent image according to loudness of a voice received by an external terminal receiving a vocal input.

14 Claims, 19 Drawing Sheets

(56) References Cited

U.S. PATENT DOCUMENTS

| | | | | |
|---|---|---|---|---|
| 8,212,922 B2* | 7/2012 | Momosaki | ......... | H04N 21/4884 |
| | | | | 704/211 |
| 10,642,575 B2* | 5/2020 | Taki | ........................... | G06T 7/70 |
| 11,211,033 B2* | 12/2021 | Furuya | .................... | G06F 3/165 |
| 2006/0129637 A1 | 6/2006 | Yoshida | | |

FOREIGN PATENT DOCUMENTS

| JP | 2006-335231 | 12/2006 |
|---|---|---|
| JP | 2007-334251 | 12/2007 |
| JP | 2008-001247 | 1/2008 |
| JP | 2010-232780 | 10/2010 |
| JP | 2014-083658 | 5/2014 |
| JP | 2015-194864 | 11/2015 |
| JP | 2018-136568 | 8/2018 |
| JP | 2019-061341 | 4/2019 |

\* cited by examiner

AGENT DEVICE, AGENT SYSTEM, METHOD FOR CONTROLLING AGENT DEVICE, AND STORAGE MEDIUM

CROSS-REFERENCE TO RELATED APPLICATION

This application is based upon and claims the benefit of priority from Japanese Patent Application No. 2019-060021, filed Mar. 27, 2019, the content of which is incorporated herein by reference.

BACKGROUND

Field

The present invention relates to an agent device, an agent system, a method for controlling an agent device, and a storage medium.

Description of Related Art

In the related art, a technology related to an agent function for providing information on driving support, control of a vehicle, other applications, and the like at a user's request through an interaction with a user of the vehicle has been disclosed (Japanese Unexamined Patent Application, First Publication No. 2006-335231).

In recent years, practical application of mounting an agent function in a vehicle has been promoted, but provision of a service for an agent function mounted in each vehicle has not been studied sufficiently. Therefore, in the technology in the related art, there are cases in which the agent function is not user-friendly.

SUMMARY

The present invention has been made in consideration of such circumstances, and an object thereof is to provide an agent device, an agent system, a method for controlling an agent device, and a storage medium in which user-friendliness of an agent can be improved.

Solution to Problem

An agent device, an agent system, a server device, a method for controlling an agent device, and a storage medium according to the present invention employ the following configurations.

(1): According to an aspect of the present invention, there is provided an agent device including a display controller configured to cause a first display to display an agent image when an agent providing a service including causing an output device to output response of voice in response to an utterance of a user is activated (starting), and a controller configured to execute particular control for causing a second display to display the agent image according to loudness of a voice received by an external terminal receiving a vocal input.

(2): In the aspect according to (1) described above, the controller is configured to perform the particular control for the second display when the loudness of a voice received by the external terminal receiving a vocal input is lower than predetermined loudness.

(3): In the aspect according to (1) or (2) described above, the second display is included in the external terminal.

(4): In the aspect according to any one of (1) to (3) described above, the display controller does not cause the first display to display the agent image when the controller executes particular control.

(5): In the aspect according to any one of (1) to (4) described above, the display controller is configured to cause the first display to display the agent image when the controller does not execute particular control.

(6): In the aspect according to any one of (1) to (5) described above, the controller is configured to cause the first display to display the agent image when a receiver receiving an input of a voice has received a voice even in a case in which the loudness of a voice received by the external terminal is lower than predetermined loudness.

(7): In the aspect according to (6) described above, the receiver is a stationary microphone provided in a vehicle, in a facility, or at a predetermined position.

(8): In the aspect according to any one of (1) to (7) described above, the first display is a stationary display provided in a vehicle, in a facility, or at a predetermined position.

(9): In the aspect according to any one of (1) to (8) described above, the external terminal is a portable terminal device.

(10): In the aspect according to any one of (1) to (9) described above, the display controller is configured to cause the first display to display the agent image in accordance with instruction information transmitted from the external terminal when the controller executes the particular control.

(11): In the aspect according to any one of (1) to (9) described above, the agent device is associated with the external terminal. The agent is configured to provide a service including causing an output device to output response of voice in response to a voice received by the external terminal.

(12): In the aspect according to any one of (1) to (11) described above, the agent device is associated with the external terminal. The display controller is configured to cause the first display to display the agent image in accordance with a voice at predetermined loudness or louder received by the external terminal. The controller does not execute the particular control in accordance with a voice at predetermined loudness or louder received by the external terminal.

(13): According to another aspect of the present invention, there is provided an agent device including a display controller configured to cause a first display provided in a form (aspect) in which a viewer is not limited to display an agent image when an agent providing a service including causing an output device to output response of voice in response to an utterance of a user is activated, and a controller configured to execute particular control for causing a second display provided in a form in which a viewer is limited to a user who has input a voice received by a first terminal to display an agent image when loudness of a voice received by the first terminal receiving a vocal input is lower than predetermined loudness.

(14): According to another aspect of the present invention, there is provided an agent system including a storage medium configured to store an application program executed by a computer causing a receiver receiving a vocal input to receive a voice, an agent device to transmit information according to a voice received by the receiver, and a first particular display to realize an agent image according to an instruction of particular control acquired from the agent device in accordance with information according to the transmitted voice; and the agent device configured to include a display controller which is configured to cause a second particular display to display an agent image when an agent providing a service including causing an output device to output response of voice in response to an utterance of a user is activated, and a controller which is configured to cause the computer to execute the particular control for causing the second particular display to display the agent image when loudness of a voice received by the receiver is lower than predetermined loudness.

(15): According to another aspect of the present invention, there is provided a method for controlling an agent device in which a computer is configured to cause a first display to display an agent image when an agent providing a service including causing an output device to output response of voice in response to an utterance of a user is activated and execute particular control for causing a second display to display the agent image according to loudness of a voice received by an external terminal receiving a vocal input.

(16): According to another aspect of the present invention, there is provided a storage medium which stores a program executed by a computer causing a first display to display an agent image when an agent providing a service including causing an output device to output response of voice in response to an utterance of a user is activated and executing particular control for causing a second display to display the agent image according to loudness of a voice received by an external terminal receiving a vocal input.

Advantageous Effects

According to (1) to (5), (7) to (9), (11), (12) to (16), the agent device configured to cause a predetermined display to display an agent image when the loudness of a received voice is lower than predetermined loudness, so that user-friendliness of an agent can be improved.

According to (6), the agent device configured to cause the first display to display an agent image when the receiver receiving an input of a voice has received a voice, so that control reflecting user's intention can be realized.

According to (10), the agent device configured to cause the first display to display an agent image in accordance with instruction information transmitted from the external terminal, so that control reflecting user's intention can be realized.

DETAILED DESCRIPTION

Hereinafter, with reference to the drawings, embodiments of an agent device, an agent system, a method for controlling an agent device, and a storage medium of the present invention will be described.

First Embodiment

The agent device is a device realizing a part or the entirety of the agent system. Hereinafter, as an example of the agent device, an agent device which is mounted in a vehicle (hereinafter, a vehicle M) and has agent functions of a plurality of kinds will be described. For example, the agent function is a function for providing various kinds of information based on a request (command) included in an utterance of a user through an interaction with the user of the vehicle M or relaying a network service. Regarding an agent function, some agents may have a function of controlling or the like of instruments (for example, instruments related to driving control and vehicle body control) inside the vehicle.

The agent functions are realized integrally utilizing a natural language processing function (a function of understanding the structure and the meaning of a text), an interaction management function, and a network searching function of searching for other devices via a network or searching for a predetermined database retained by a host device, for example, in addition to a voice recognition function (a function of converting a voice into a text) of recognizing voice of the user. Some or all of the functions may be realized by an artificial intelligence (AI) technology. A part (particularly, the voice recognition function and a natural language processing interpretation function) of the configuration for performing the functions may be mounted in an agent server (external device) which can communicate with an in-vehicle communication device of the vehicle M or a general-purpose communication device carried into the vehicle M. The following description will be given on the premise that a part of the configuration is mounted in the agent server and the agent device and the agent server realize the agent system in cooperation with each other. A service which is virtually realized by the agent device and the agent server in cooperation with each other or a providing entity (service entity) thereof will be referred to as an agent.

<Overall Configuration>

Figure 1:
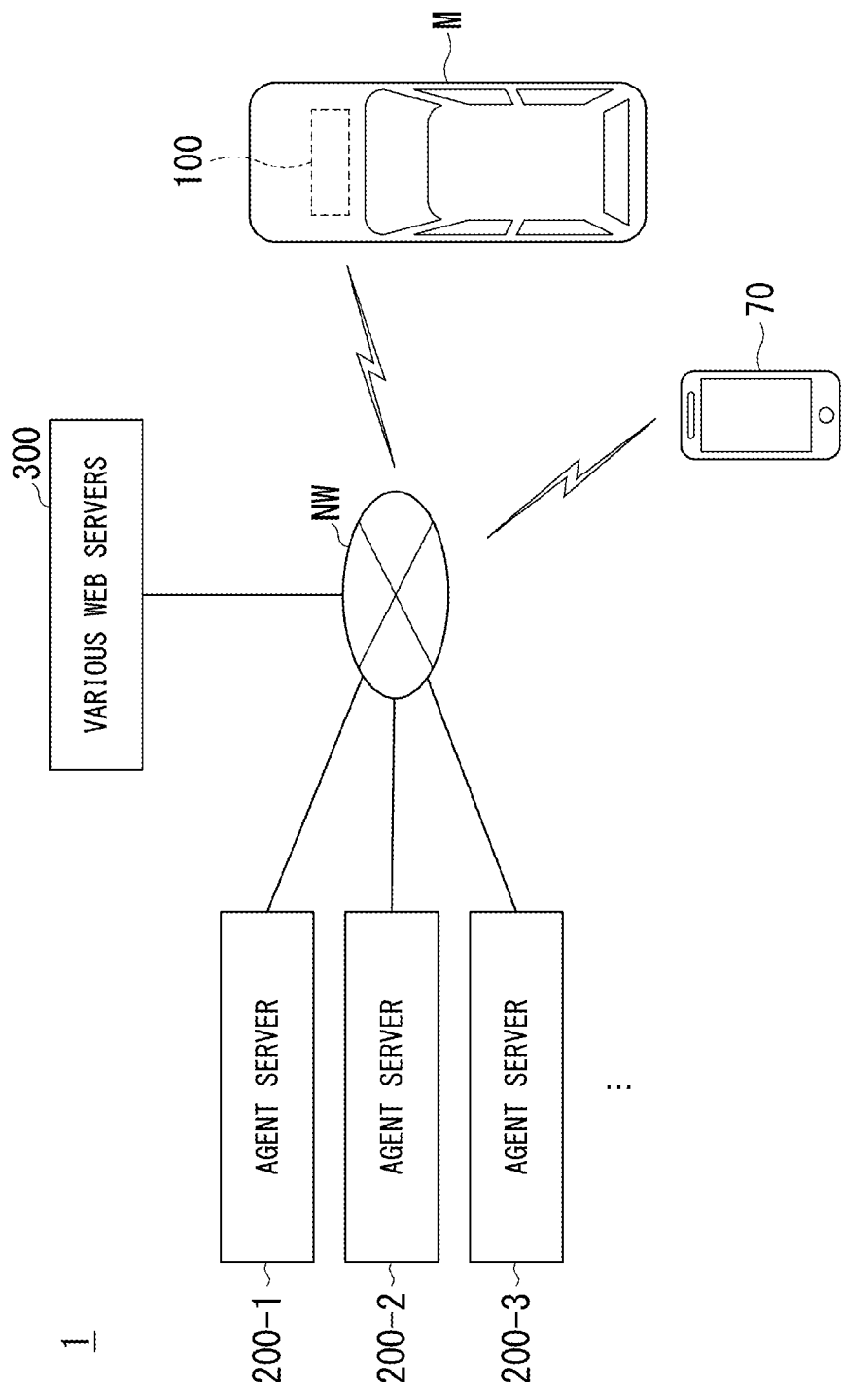
FIG. 1 is a view of a configuration of an agent system 1 including agent devices.

FIG. 1 is a view of a configuration of an agent system 1 including one or more agent devices 100. For example, the agent system 1 includes a general-purpose communication device 70, agent device 100, a plurality of agent servers 200-1, 200-2, 200-3, and so on, and an information processing server 300. A number after the hyphen at the end of the reference sign of the agent server 200 is an identifier for distinguishing the agent. When the agent servers are not distinguished from each other, there are cases in which the agent server is simply referred to as an agent server 200. In FIG. 1, three agent servers 200 are shown, but the number of agent servers 200 may be two, four, or more.

The agent servers 200 are operated by providers of the respective agent systems different from each other. Therefore, the agents in the present invention are agents realized by providers different from each other. Examples of the providers include automobile manufacturers, network service companies, electronic commerce companies, and vendors of portable terminals, and arbitrary entities (corporations, organizations, individuals, and the like) may serve as a provider of the agent system.

The agent device 100 communicates with the agent server 200 via a network NW. Examples of the network NW include some or all of the Internet, a cellular network, a Wi-Fi network, a wide area network (WAN), a local area network (LAN), a public line, a telephone line, and a radio base station. Various Web servers 300 are connected to the network NW, and the agent server 200 or the agent device 100 can acquire Web pages from the various Web servers 500 via the network NW.

The agent device 100 interacts with the user of the vehicle M, transmits voice from the user to the agent server 200, and presents a response obtained from the agent server 200 to the user in a form (aspect) of an output voice or an image display.

[General-Purpose Communication Device]

Figure 2:
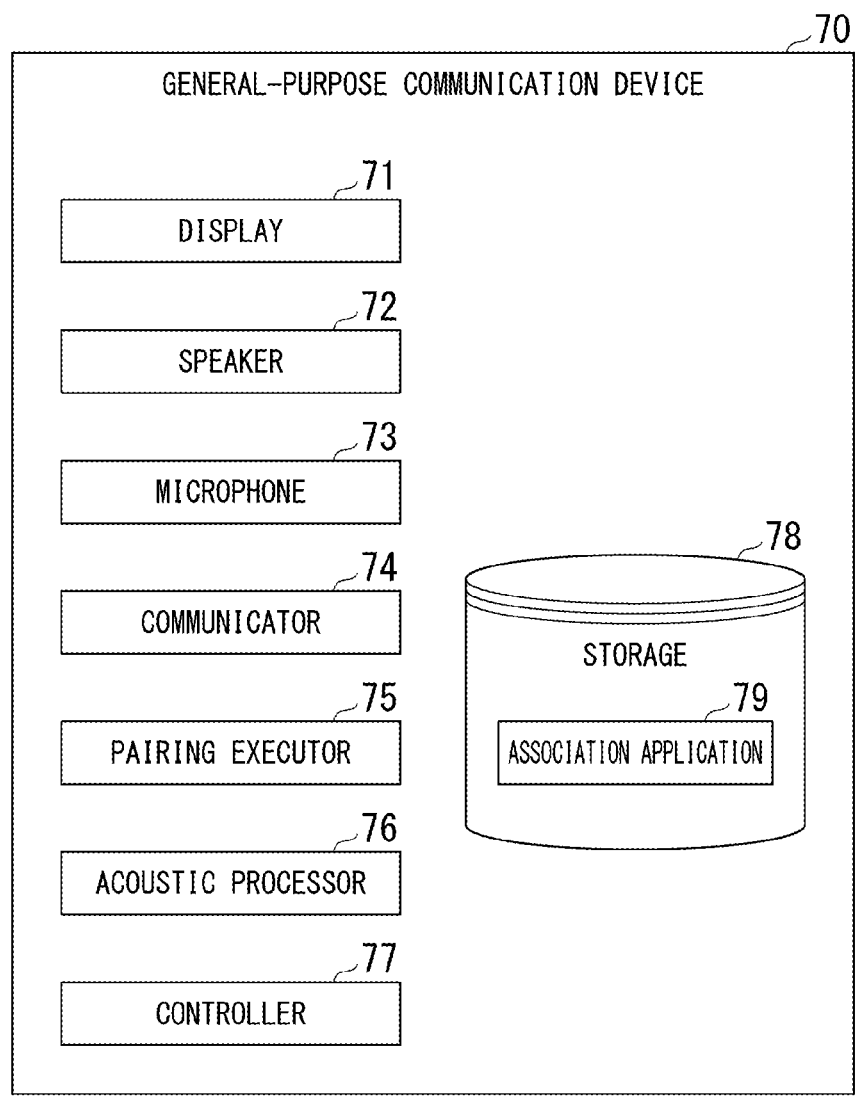
FIG. 2 is a view showing an example of a configuration of a function of a general-purpose communication device.

FIG. 2 is a view showing an example of a configuration of a function of the general-purpose communication device 70. The general-purpose communication device 70 is a device such as a smartphone or a tablet terminal which is transportable or portable. For example, the general-purpose communication device 70 includes a display 71, speakers 72, a microphone 73, a communicator 74, a pairing executor 75, an acoustic processor 76, a controller 77, and a storage 78. The storage 78 stores an association application program (association application 79). The association application 79 may be provided from an application providing server (not shown in the diagram) or may be provided from the vehicle M.

The association application 79 transmits information acquired by the general-purpose communication device 70 to the agent device 100 or provides information transmitted from the agent device 100 to the user based on an operation performed by the user with respect to the general-purpose communication device 70.

The display 71 includes a display device such as a liquid crystal display (LCD) or an organic electroluminescence (EL) display. The display 71 displays an image based on control of the controller 77. The speakers 72 output a voice based on control of the controller 77. The microphone 73 collects a voice input by the user.

The communicator 74 is a communication interface for communication with the agent device 100. For example, the pairing executor 75 executes pairing with the agent device 100 using radio communication such as Bluetooth (registered trademark). The acoustic processor 76 performs acoustic processing with respect to an input sound.

The controller 77 is realized by a processor such as a central processing unit (CPU) executing the association application 79 (software). The controller 77 controls each of the elements (for example, the display 71 and the speakers 72) of the general-purpose communication device 70. The controller 77 manages information input to the host device in the agent device 100 or manages information input by the agent device 100.

[Vehicle]

Figure 3:
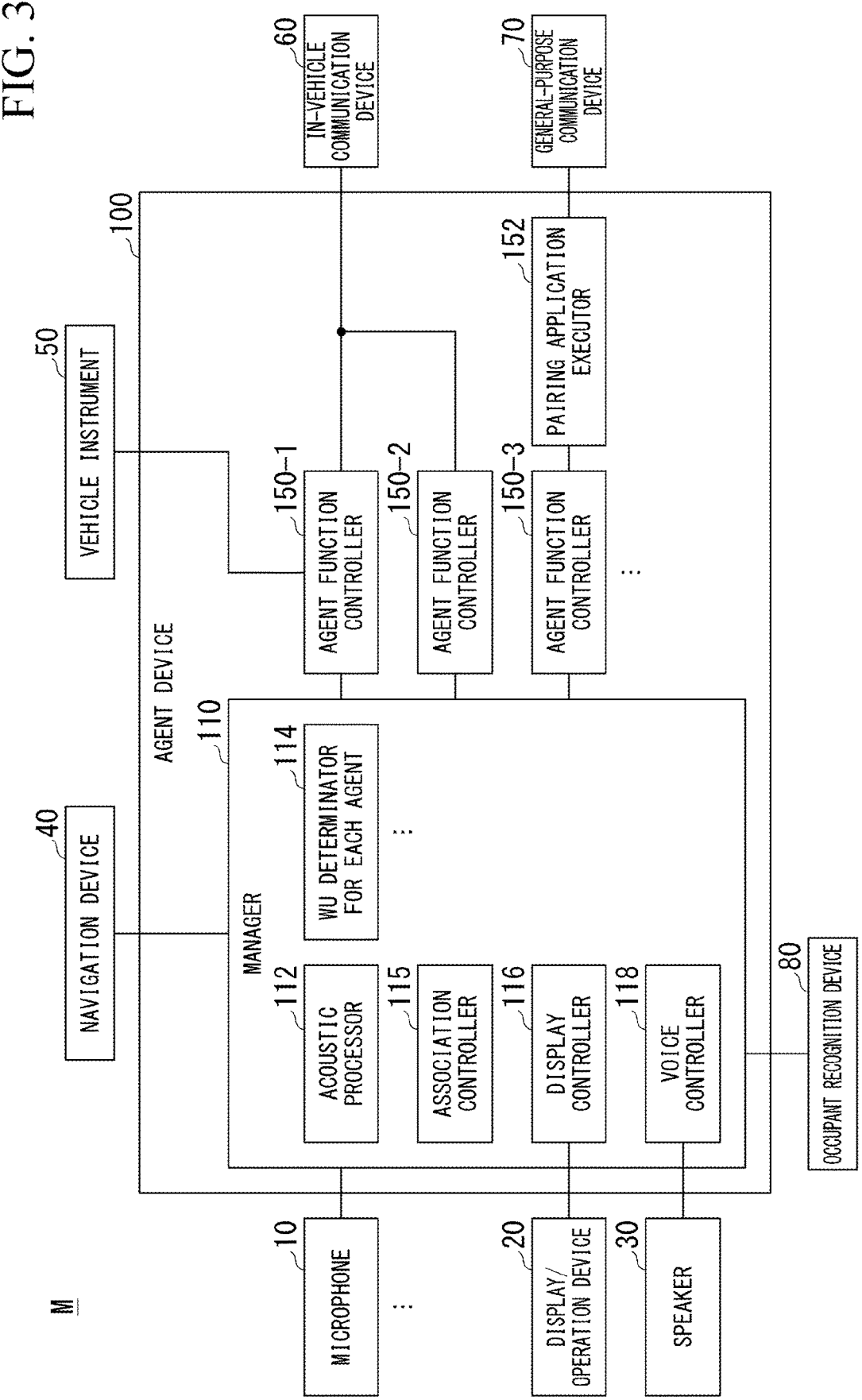
FIG. 3 is a view showing a configuration of the agent device according to a first embodiment and instruments mounted in a vehicle M.

FIG. 3 is a view showing a configuration of the agent device 100 according to a first embodiment and instruments mounted in the vehicle M. For example, one or more microphones 10, a display/operation device 20, speakers 30, a navigation device 40, a vehicle instrument 50, an in-vehicle communication device 60, an occupant recognition device 80, and the agent device 100 are mounted in the vehicle M. There are cases in which the general-purpose communication device 70 is carried into a vehicle cabin and is used as a communication device. The devices are connected to each other through a multiplex communication line (a controller area network (CAN) communication line or the like), a serial communication line, a radio communication network, or the like. The configuration shown in FIG. 3 is merely an example. A part of the configuration may be omitted, or a different configuration may be added further.

The microphone 10 is a sound collector collecting voice emitted inside the vehicle cabin. The display/operation device 20 is a device (or a device group) capable of displaying an image and receiving an input operation. For example, the display/operation device 20 includes a display device configured as a touch panel. The display/operation device 20 may further include a head up display (HUD) or a mechanical input device. For example, the speakers 30 include a plurality of speakers (sound output devices) arranged at positions different from each other inside the vehicle cabin. The display/operation device 20 may be shared between the agent device 100 and the navigation device 40. These will be described below in detail.

The navigation device 40 includes a navigation human machine interface (HMI), a positioning device such as a global positioning system (GPS), a storage device storing map information, and a control device (navigation controller) performing route searching or the like. Some or all of the microphone 10, the display/operation device 20, and the speakers 30 may be used as the navigation HMI. The navigation device 40 searches for a route (navigation route) to move from the position of the vehicle M identified by the positioning device to a destination input by the user and outputs guidance information using the navigation HMI such that the vehicle M can travel along the route. The route searching function may be provided in a navigation server which is accessible via the network NW. In this case, the navigation device 40 acquires a route from the navigation server and outputs guidance information. The agent device 100 may be established on the basis of the navigation controller. In such a case, the navigation controller and the agent device 100 are configured integrally in respect of hardware.

For example, the vehicle instrument 50 includes driving force output devices such as an engine and a motor for traveling, a starting motor for the engine, a door lock device, door opening/closing devices, an air-conditioning device, and the like.

For example, the in-vehicle communication device 60 is a radio communication device which is accessible to the network NW utilizing a cellular network or a Wi-Fi network.

For example, the occupant recognition device 80 includes seat sensors, an in-cabin camera, an image recognition device, and the like. The seat sensors include pressure sensors provided under the seats, tension sensors attached to seatbelts, and the like. The in-cabin camera is a charge coupled device (CCD) camera or a complementary metal oxide semiconductor (CMOS) camera provided inside the vehicle cabin. The image recognition device analyzes images captured by the in-cabin camera and recognizes the presence or absence of a user at each seat, orientation of the face, and the like. In the present embodiment, the occupant recognition device 80 is an example of a seated position recognizer.

Figure 4:
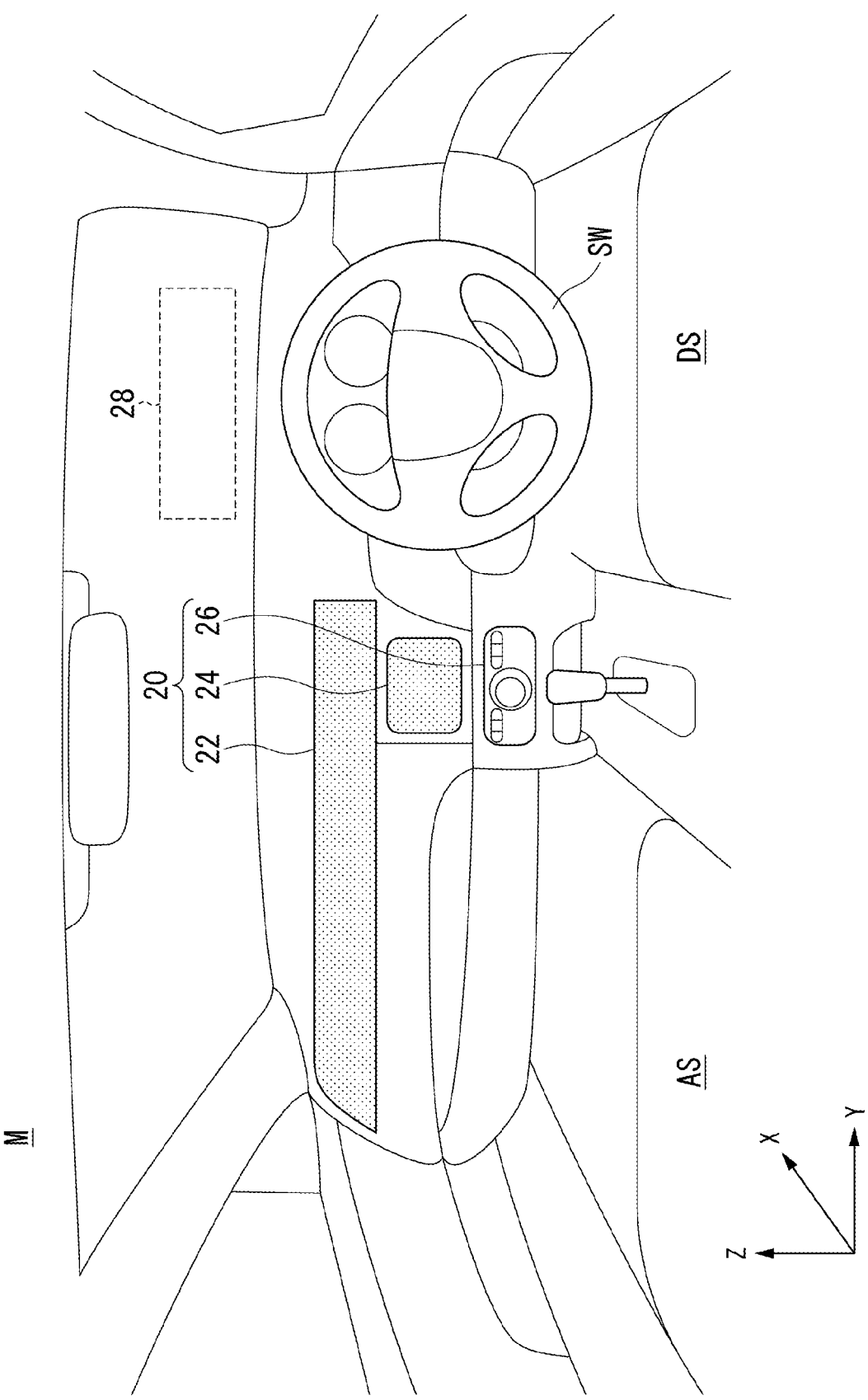
FIG. 4 is a view showing a disposition example of a display/operation device.

FIG. 4 is a view showing a disposition example of the display/operation device 20. For example, the display/operation device 20 includes a first display 22, a second display 24, and an operation switch assembly 26. The display/operation device 20 may further include an HUD 28.

For example, in the vehicle M, a driver's seat DS in which a steering wheel SW is provided, and an assistant driver's seat AS provided next to the driver's seat DS in a vehicle width direction (Y direction in the diagram) are present. The first display 22 is a display device having a horizontally elongated shape extending from approximately between the driver's seat DS and the assistant driver's seat AS in an instrument panel to a position facing the left end part of the assistant driver's seat AS. The second display 24 is installed approximately between the driver's seat DS and the assistant driver's seat AS in the vehicle width direction and below the first display 22. For example, both the first display 22 and the second display 24 are configured as touch panels and include a liquid crystal display (LCD), an organic electroluminescence (EL), a plasma display, or the like as a display. The operation switch assembly 26 is a cluster of dial switches, button switches, and the like. The display/operation device 20 outputs details of an operation performed by the user to the agent device 100. The agent device 100 may determine the details to be displayed by the first display 22 or the second display 24.

Figure 5:
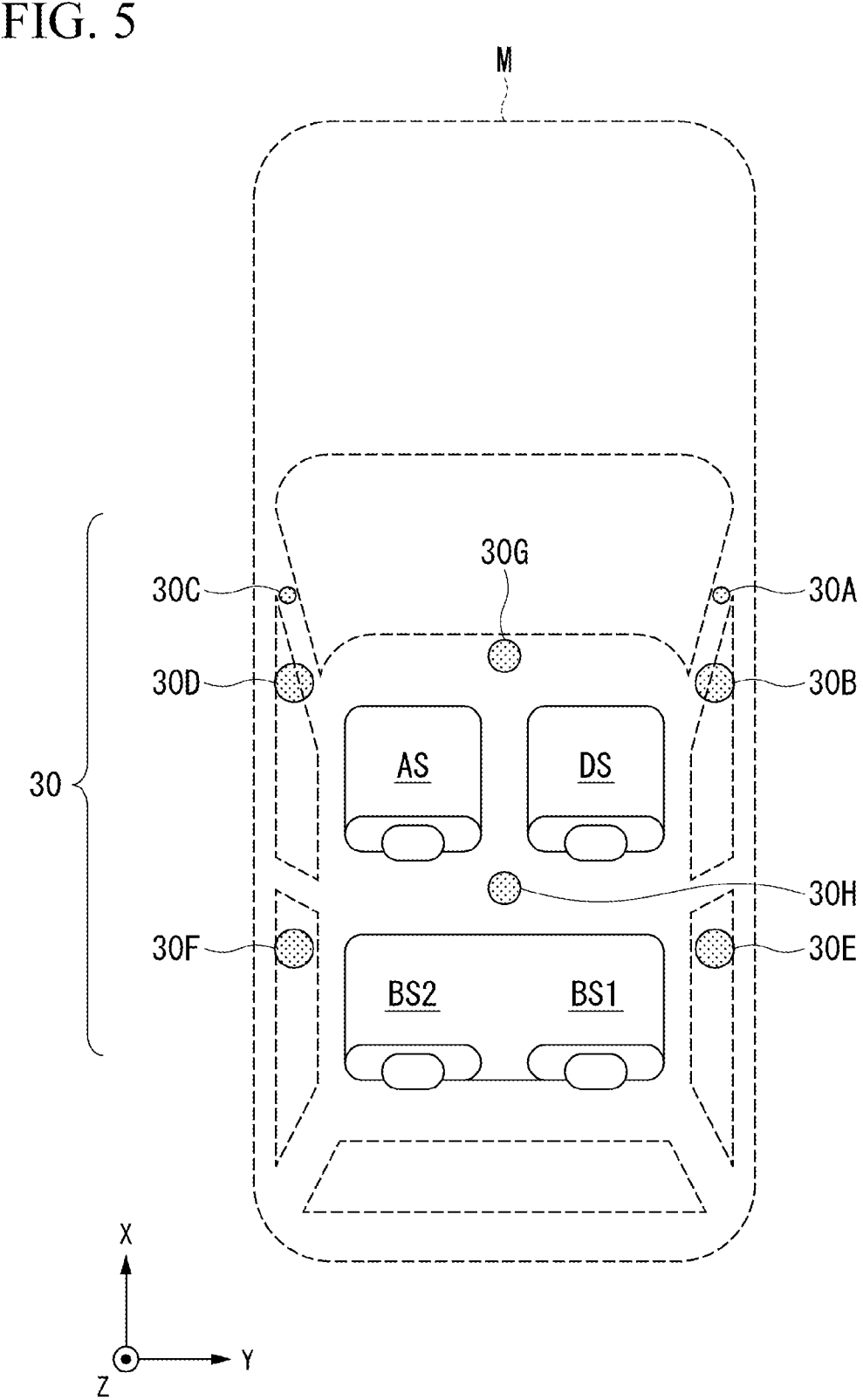
FIG. 5 is a view showing a disposition example of speakers.

FIG. 5 is a view showing a disposition example of the speakers 30. For example, the speakers 30 include speakers 30A to 30H. The speaker 30A is installed in a window pillar (a so-called A-pillar) on the driver's seat DS side. The speaker 30B is installed in a lower part of a door near the driver's seat DS. The speaker 30C is installed in a window pillar on the assistant driver's seat AS side. The speaker 30D is installed in a lower part of a door near the assistant driver's seat AS. The speaker 30E is installed in a lower part of a door near a rear right seat BS1 side. The speaker 30F is installed in a lower part of a door near a rear left seat BS2 side. The speaker 30G is installed in the vicinity of the second display 24. The speaker 30H is installed in a ceiling (roof) of the cabin.

For example, regarding the disposition, when a sound is output exclusively from the speakers 30A and 30B, a sound image is localized in the vicinity of the driver's seat DS. When a sound is output exclusively from the speakers 30C and 30D, a sound image is localized in the vicinity of the assistant driver's seat AS. When a sound is output exclusively from the speaker 30E, a sound image is localized in the vicinity of the rear right seat BS1. When a sound is output exclusively from the speaker 30F, a sound image is localized in the vicinity of the rear left seat BS2. When a sound is output exclusively from the speaker 30G, a sound image is localized in the vicinity of the front of the cabin, and when a sound is output exclusively from the speaker 30H, a sound image is localized in the vicinity of an upper part of the cabin. The speakers 30 are not limited to this disposition, and a sound image can be localized at an arbitrary position inside the vehicle cabin by adjusting the distribution of sounds output from each of the speakers using a mixer or an amplifier.

[Agent Device]

Returning to FIG. 3, the agent device 100 includes a manager 110, agent function controllers 150-1, 150-2, and 150-3, and a pairing application executor 152. For example, the manager 110 includes an acoustic processor 112, a wake-up (WU) determinator 114 for each agent, an association controller 115, a display controller 116, and a voice controller 118. When the agent function controllers are not distinguished from each other, the agent function controller will be simply referred to as an agent function controller 150. Three agent function controllers 150 shown in the diagram are merely an example corresponding to (associated with) the number of agent servers 200 in FIG. 1. The number of agent function controllers 150 may be two, four, or more. The disposition of software shown in FIG. 3 is shown simply for the sake of description. For example, in practice, the manager 110 may be interposed between the agent function controller 150 and the in-vehicle communication device 60, and the disposition can be modified and changed arbitrarily.

For example, each of the constituent elements of the agent device 100 is realized by a hardware processor such as a CPU executing a program (software). Some or all of the constituent elements may be realized by hardware (a circuit; including circuitry) such as a large scale integration (LSI), an application specific integrated circuit (ASIC), a field-programmable gate array (FPGA), or a graphics processing unit (GPU) or may be realized by software and hardware in cooperation.

The program may be stored in a storage device (a storage device having a non-transitory storage medium) such as a hard disk drive (HDD) or a flash memory in advance or may be stored in an attachable/detachable storage medium (non-transitory storage medium) such as a DVD or a CD-ROM such that the program is installed when the storage medium is mounted in a drive device.

The manager 110 functions when a program such as an operating system (OS) or middleware is executed.

The acoustic processor 112 of the manager 110 performs acoustic processing with respect to an input sound to realize a state suitable for recognizing wake-up words set for each agent in advance.

The WU determinator 114 for each agent is present associated with each of the agent function controllers 150-1, 150-2, and 150-3 and recognizes the wake-up words set for each agent in advance. The WU determinator 114 for each agent recognizes the meaning of voice from a voice (voice stream) subjected to acoustic processing. First, the WU determinator 114 for each agent detects a voice section based on the amplitude and the zero crossing of a voice waveform in a voice stream. The WU determinator 114 for each agent may perform sectional detection based on voice identification and non-voice identification in frame units based on a Gaussian mixture model (GMM).

Next, the WU determinator 114 for each agent converts a voice in a detected voice section into a text for text information. Further, the WU determinator 114 for each agent determines whether or not text information (converted text) associates with a wake-up word. When it is determined that text information associates with a wake-up word, the WU determinator 114 for each agent starts the associated agent function controller 150. A function associated with the WU determiner 114 for each agent may be mounted in the agent server 200. In this case, the manager 110 transmits a voice stream subjected to acoustic processing by the acoustic processor 112 to the agent server 200. When the agent server 200 determines that the transmitted voice stream associates with a wake-up word, the agent function controller 150 starts in accordance with an instruction from the agent server 200. Each of the agent function controllers 150 is in operation at all times and may perform determination of a wake-up word by itself. In this case, there is no need for the manager 110 to include the WU determinator 114 for each agent.

The agent function controller 150 realizes an agent in cooperation with the associated agent server 200 and provides a service including causing an output device to output response of voice in response to an utterance of the user of the vehicle M. The agent function controllers 150 may include an agent function controller having authority to control the vehicle instrument 50. The agent function controller 150 may be associated with the general-purpose communication device 70 via the pairing application executor 152 and may communicate with the agent server 200. For example, the agent function controller 150-1 has authority to control the vehicle instrument 50. The agent function controller 150-1 communicates with the agent server 200-1 via the in-vehicle communication device 60. The agent function controller 150-2 communicates with the agent server 200-2 via the in-vehicle communication device 60. The agent function controller 150-3 is associated with the general-purpose communication device 70 via the pairing application executor 152 and communicates with the agent server 200-3.

For example, the pairing application executor 152 performs pairing with the general-purpose communication device 70 and connects the agent function controller 150-3 and the general-purpose communication device 70 to each other. The agent function controller 150-3 may be connected to the general-purpose communication device 70 through wired communication utilizing a universal serial bus (USB) or the like. Hereinafter, there are cases in which an agent realized in cooperation between the agent function controller 150-1 and the agent server 200-1 is referred to as an agent 1, an agent realized in cooperation between the agent function controller 150-2 and the agent server 200-2 is referred to as an agent 2, and an agent realized in cooperation between the agent function controller 150-3 and the agent server 200-3 is referred to as an agent 3.

When loudness of a voice received by the general-purpose communication device 70 receiving a vocal input is equal to or lower than predetermined loudness, the association controller 115 causes the general-purpose communication device 70 to execute particular control for causing a display of the general-purpose communication device 70 to display an agent image. This processing will be described below in detail in [Overview of association processing]. For example, "predetermined loudness" may be an input of 40 dB or lower, may be preferably 30 dB, or may be a case of being determined to be equal to or lower than loudness of a normal voice of an utterance in the vehicle M. Moreover, "predetermined loudness" may be determined to be loudness in which a traveling sound, an environmental sound, and the like of the vehicle M are offset.

The display controller 116 causes the first display 22 or the second display 24 to display an image in accordance with an instruction of the agent function controller 150. Hereinafter, the first display 22 will be used. Due to control of some agent function controllers 150, for example, the display controller 116 generates an image of an agent (which will hereinafter be referred to as an agent image) which is personified and performs communication with the user inside the vehicle cabin, and the display controller 116 causes the first display 22 to display the generated agent image. For example, an agent image is an image in a form of speaking to the user. For example, an agent image may include a facial image to the extent that a facial expression or orientation of the face is recognized by at least a viewer (user). For example, in an agent image, parts imitating eyes and a nose may be expressed in a facial area, and a facial expression or orientation of the face may be recognized based on positions of the parts in the facial area. An agent image is an image which is perceived three-dimensionally by a viewer and in which orientation of the face of an agent is recognized due to an included head image in a three-dimensional space. An agent image may be an image in which movements, a behavior, a posture, and the like of an agent are recognized and which includes an image of a main body (the body or limbs). An agent image may be an animation image.

The voice controller 118 causes some or all of the speakers included in the speakers 30 to output voices in accordance with an instruction of the agent function controller 150. The voice controller 118 may perform control in which a sound image of an agent voice is localized at a position associated with a display position of an agent image using the plurality of speakers 30. For example, a position associated with a display position of an agent image is an expected position where the user feels that an agent image talks with an agent voice and is specifically a position in the vicinity (for example, within 2 to 3 [cm]) of a display position of an agent image. For example, localization of a sound image denotes that a spatial position of a sound source which the user feels is set through adjustment of the loudness of sounds transferred to the right and left ears of the user.

Figure 6:
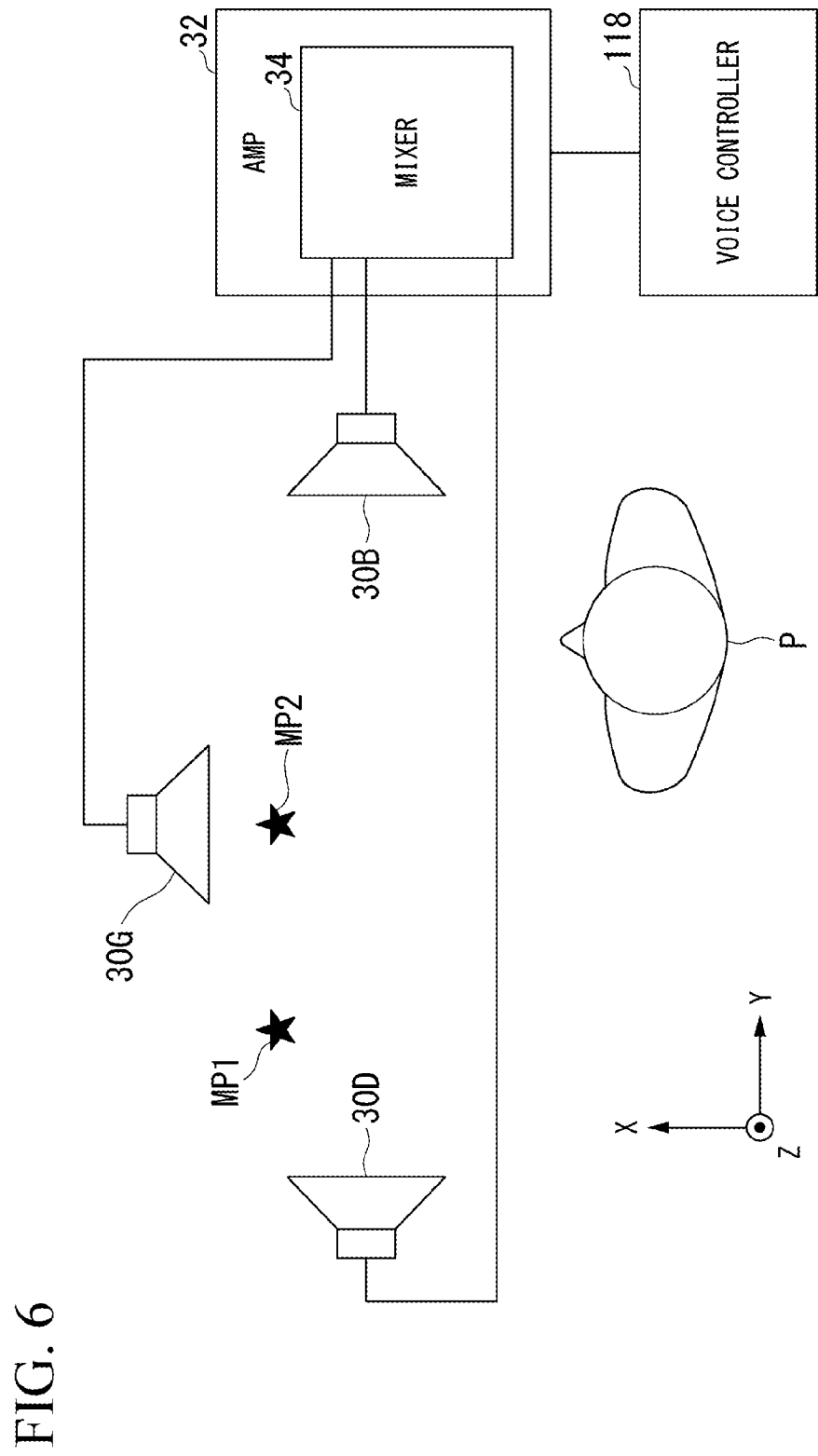
FIG. 6 is a view showing a principle of setting a position where a sound image is localized.

FIG. 6 is a view showing a principle of setting a position where a sound image is localized. In FIG. 6, for the sake of simplification of description, an example using the speakers 30B, 30D, and 30G described above is shown, but arbitrary speakers included in the speakers 30 may be used. The voice controller 118 controls an amplifier (AMP) 32 and a mixer 34 connected to each of the speakers such that a sound image is localized. For example, when a sound image is localized at a spatial position MP1 shown in FIG. 6, the voice controller 118 controls the amplifier 32 and the mixer 34 such that the speaker 30B outputs 5% of a maximum intensity, the speaker 30D outputs 80% of the maximum intensity, and the speaker 30G outputs 15% of the maximum intensity. As a result, a user P feels that a sound image is localized at the spatial position MP1 shown in FIG. 6 from the position of the user P.

When a sound image is localized at a spatial position MP2 shown in FIG. 6, the voice controller 118 controls the amplifier 32 and the mixer 34 such that the speaker 30B outputs 45% of the maximum intensity, the speaker 30D outputs 45% of the maximum intensity, and the speaker 30G outputs 45% of the maximum intensity. As a result, the user P feels that a sound image is localized at the spatial position MP2 shown in FIG. 6 from the position of the user P. In this manner, a position where a sound image is localized can be changed by adjusting the plurality of speakers provided inside the vehicle cabin and the loudness of sound output from each of the speakers. More specifically, a position where a sound image is localized is set based on sound characteristics which a sound source inherently retains, information of the environment inside the vehicle cabin, and a head-related transfer function (HRTF). Accordingly, the voice controller 118 localizes a sound image at a predetermined position by controlling the speakers 30 with an optimum distribution which has been acquired in advance through a sensory test or the like.

[Agent Server]

Figure 7:
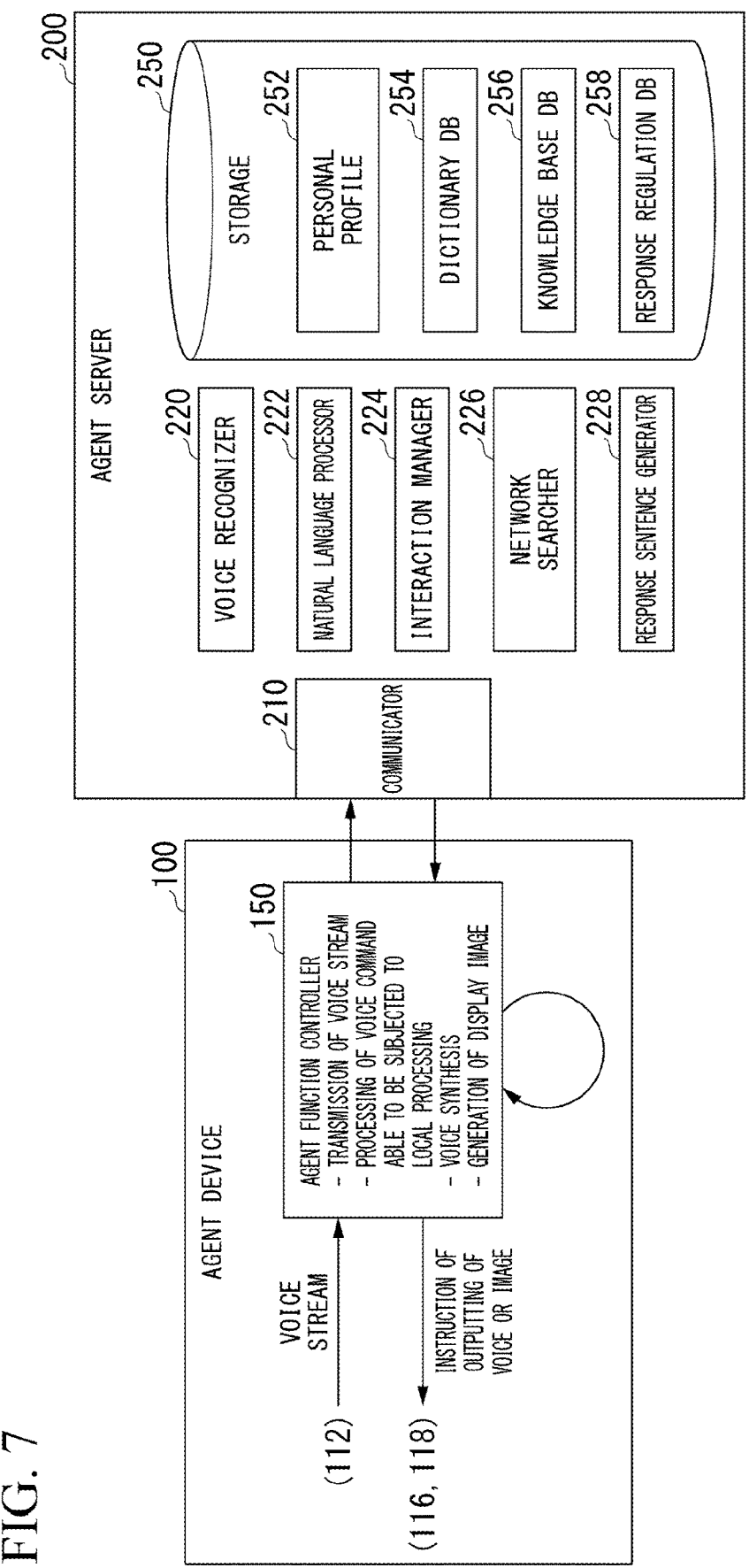
FIG. 7 is a view showing a configuration of an agent server and a part of a configuration of the agent device.

FIG. 7 is a view showing a configuration of the agent server 200 and a part of a configuration of the agent device 100. Hereinafter, operation of the agent function controller 150 and the like will be described together with a configuration of the agent server 200. Here, description regarding physical communication from the agent device 100 to the network NW will be omitted.

The agent server 200 includes a communicator 210. For example, the communicator 210 is a network interface such as a network interface card (NIC). For example, the agent server 200 further includes a voice recognizer 220, a natural language processor 222, an interaction manager 224, a network searcher 226, and a response sentence generator 228. For example, the constituent elements are realized when a hardware processor such as a CPU executes a program (software). Some or all of the constituent elements may be realized by hardware (a circuit; including circuitry) such as an LSI, an ASIC, an FPGA, or a GPU or may be realized by software and hardware in cooperation. The program may be stored in a storage device (a storage device having a non-transitory storage medium) such as an HDD or a flash memory in advance or may be stored in an attachable/detachable storage medium (non-transitory storage medium) such as a DVD or a CD-ROM such that the program is installed when the storage medium is mounted in a drive device.

The agent server 200 includes a storage 250. The storage 250 is realized by the various storage devices described above. The storage 250 stores data such as a personal profile 252, a dictionary database (DB) 254, a knowledge base DB 256, and a response regulation DB 258; and a program.

In the agent device 100, the agent function controller 150 transmits a voice stream or a voice stream subjected to processing such as compression or encoding to the agent server 200. When a voice command which can be subjected to local processing (processing without involving the agent server 200) is recognized, the agent function controller 150 may perform processing requested by the voice command A voice command which can be subjected to local processing is a voice command which can be responded with reference to a storage (not shown in the diagram) included in the agent device 100 or a voice command for controlling the vehicle instrument 50 (for example, a command for turning on the air-conditioning device, or the like) in the case of the agent function controller 150-1. Therefore, the agent function controller 150 may have some of the functions provided in the agent server 200.

When a voice stream is acquired, the agent device 100 outputs text information which has been converted into a text by the voice recognizer 220 through voice recognition, and the natural language processor 222 interprets the meaning of the text information with reference to the dictionary DB 254. In the dictionary DB 254, abstracted meaning information is associated with text information. The dictionary DB 254 may include list information of synonyms or near-synonyms. The processing of the voice recognizer 220 and the processing of the natural language processor 222 are not distinctly divided into stages and may be performed while affecting each other. For example, the voice recognizer 220 may revise a result of recognition upon reception of a result of processing of the natural language processor 222.

For example, when a meaning such as "HOW IS THE WEATHER TODAY?" or "HOW IS THE WEATHER?" is recognized as a result of recognition, the natural language processor 222 generates a command replaced with "TODAY'S WEATHER" which is standard text information. Accordingly, even when a voice of a request has a text variation, a requested interaction can be easily performed. In addition, for example, the natural language processor 222 may recognize the meaning of the text information using artificial intelligence processing such as machine learning processing utilizing probability or may generate a command based on a result of recognition.

The interaction manager 224 determines details of an utterance with respect to the user of the vehicle M with reference to the personal profile 252, the knowledge base DB 256, and the response regulation DB 258 based on a result (command) of processing of the natural language processor 222. The personal profile 252 includes individual information, interests/preferences, past history of interactions, and the like of users retained for each of users. The knowledge base DB 256 is information in which relationships of matters are regulated. The response regulation DB 258 is information in which operation (a response, details of instrument control, or the like) to be performed by an agent with respect to a command is regulated.

The interaction manager 224 may identify the user by making an inquiry to the personal profile 252 using feature information obtained from a voice stream. In this case, for example, in the personal profile 252, the individual information is associated with the feature information of a voice. For example, the feature information of a voice is information on the feature quantities based on features of a way of talking, such as a voice pitch, an intonation, and a rhythm (a pattern of a voice pitch); mel frequency cepstrum coefficients; and the like. For example, the feature information of a voice is information obtained by causing the user to speak predetermined words, sentences, or the like at the time of initial registration of the user and recognizing the spoken voice. When a command requests information which is searchable via the network NW, the interaction manager 224 causes the network searcher 226 to perform searching. The network searcher 226 accesses the various Web servers 500 via the network NW and acquires desired information. For example, "information which is searchable via the network NW" may be a result of evaluation made by general users of a restaurant around the vehicle M or may be a weather forecast at the position of the vehicle M of the day.

The response sentence generator 228 generates a response sentence such that details of an utterance determined by the interaction manager 224 is transferred to the user of the vehicle M and transmits the generated response sentence to the agent device 100. When it is identified that the user is a user registered in a personal profile, the response sentence generator 228 may call the user's name or may generate a response sentence in a way of talking similar to the way the user talks. When the interaction manager 224 determines to provide music to the user, processing of the response sentence generator 228 is omitted, and information of a piece of music obtained based on a searching result of the network searcher 226 is provided to the agent function controller 150. Hereinafter, when a response sentence and information such as a piece of music provided to the user are not distinguished from each other, there are cases in which they are referred to as "response information".

When a response sentence is acquired, the agent function controller 150 instructs the voice controller 118 to perform voice synthesis and output a voice. The agent function controller 150 instructs the display controller 116 to display an image of an agent in accordance with the output of a voice. In this manner, the agent function in which a virtually-realized agent responds to the user of the vehicle M is realized.

[Overview of Association Processing]

Figure 8:
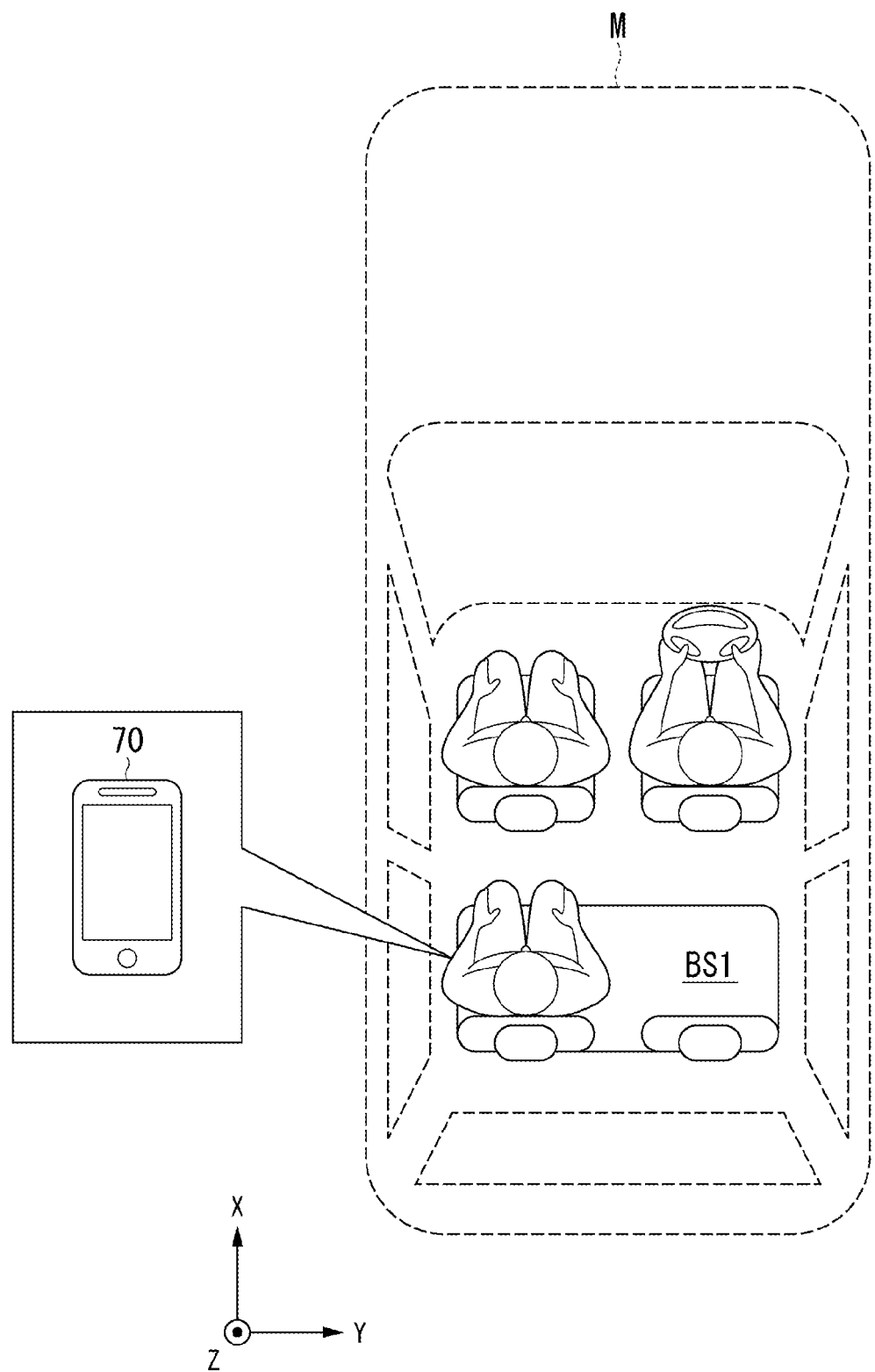
FIG. 8 is a view showing an example of a scene in which a general-purpose terminal device and the agent device are utilized.

The general-purpose terminal device 70 (external terminal) and the agent device 100 are associated with each other, so that an agent provides a service to an occupant. FIG. 8 is a view showing an example of a scene in which the general-purpose terminal device 70 and the agent device 100 are utilized. For example, when an occupant of the vehicle M starts the association application 79, the general-purpose communication device 70 is associated with the agent device 100. Further, when an occupant inputs a voice to the microphone 73 of the general-purpose terminal device 70, the agent device 100 acquires a voice input from the associated general-purpose terminal device 70, and an agent is realized by a configuration of one or more functions of the display/operation device 20, the speakers 30, the display 71 of the general-purpose terminal device 70, and the speakers 72 of the general-purpose terminal device 70 based on the acquired information. "Being realized" denotes that an agent appears in a form (aspect) which an occupant can recognize. For example, "being realized" denotes that an agent outputs a voice through the speakers or the display displays an agent image.

The display included in the display/operation device 20 is an example of "a first display". The display included in the general-purpose communication device 70 is an example of "a second display". The second display may be included in a device different from the general-purpose communication device 70.

The first display 22 or the second display 24 is an example of "a first display provided in a form in which a viewer is not limited". The general-purpose communication device 70 is an example of "a first terminal receiving a vocal input". The display 71 of the general-purpose communication device 70 or a different display (not shown in the diagram) is an example of "a second display provided in a form in which a viewer is limited to a user who has input a voice received by the first terminal".

For example, there are cases in which an occupant may not want other occupants to be aware of an agent which is realized in accordance with a voice input by himself or herself or a service provided by an agent. In such a case, the following association processing is applied.

[Flowchart of Association Processing]

Figure 9:
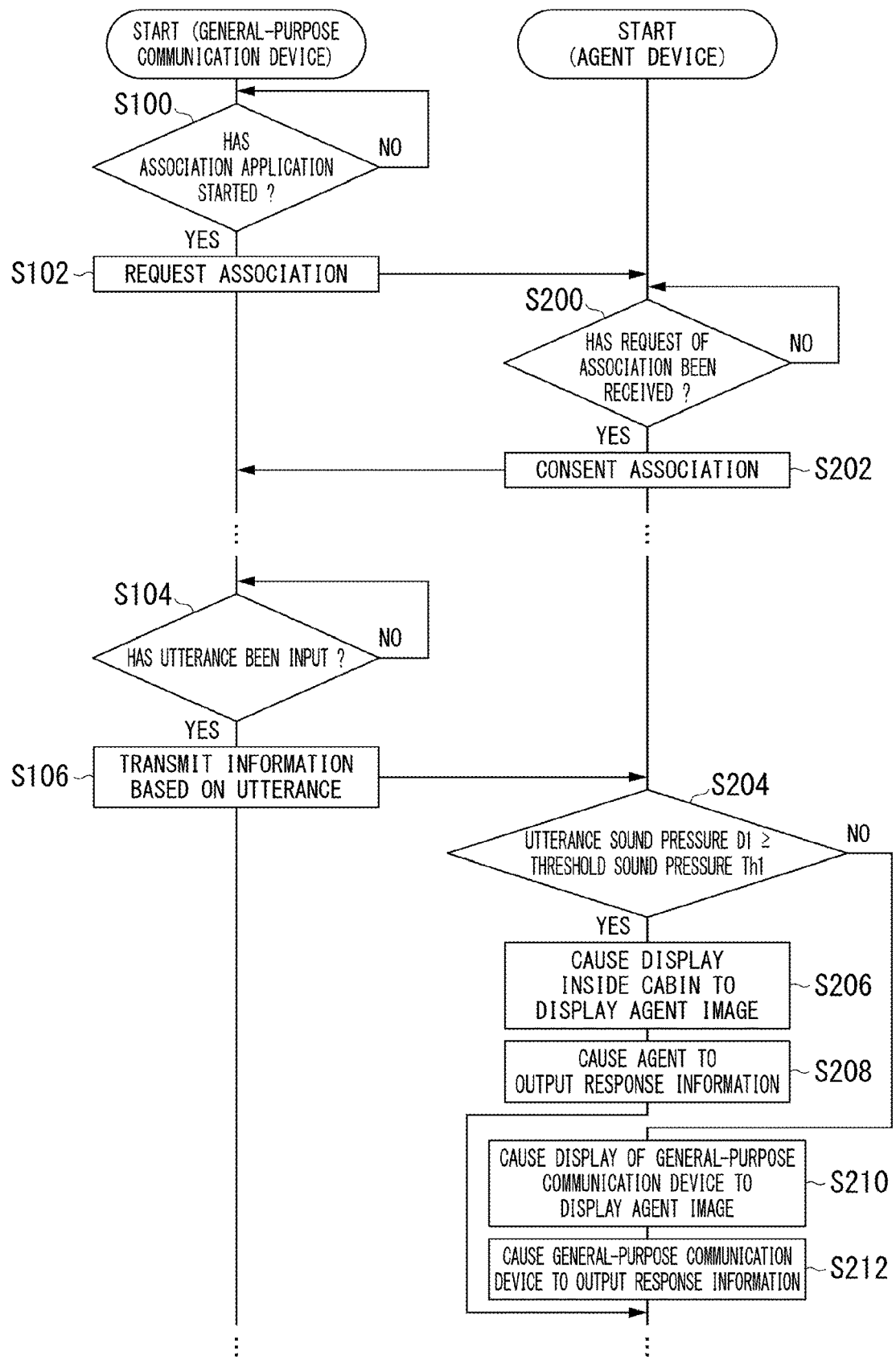
FIG. 9 is a flowchart (Part 1) showing an example of a flow of processing executed by the general-purpose terminal device and the agent device.

FIG. 9 is a flowchart (Part 1) showing an example of a flow of processing executed by the general-purpose terminal device 70 and the agent device 100. First, the general-purpose communication device 70 determines whether or not the association application 79 has started (Step S100). When the association application 79 has started, the controller 77 requests association to the agent device 100 (Step S102).

The agent device 100 determines whether or not a request of the controller 77 for association has been received (Step S200). When a request of the controller 77 for association has been received, the agent device 100 consents to the association in accordance with the request for association and transmits information indicating that the association has been consented to the general-purpose communication device 70 (Step S202). Accordingly, the general-purpose communication device 70 and the agent device 100 are associated with each other. Due to the association, a voice input to the general-purpose communication device 70 is transmitted to the agent device 100, or an agent is realized in the general-purpose communication device 70.

Next, the general-purpose communication device 70 determines whether or not an utterance of an occupant has been input (Step S104). When it is determined that an utterance of an occupant has been input, the general-purpose communication device 70 transmits information based on the utterance to the agent device 100 (Step S106).

Information based on an utterance may be a voice stream subjected to acoustic processing or may be information before it is subjected to acoustic processing. When information before acoustic processing is transmitted, the agent device 100 performs acoustic processing with respect to the information based on the utterance. When the information based on the utterance transmitted in Step S106 has been acquired, the agent device 100 transmits the information based on the utterance to the agent server 200 and acquires response information from the agent server 200.

Information based on an utterance includes information indicating the loudness of a voice input to the general-purpose communication device 70 or information for deriving the loudness of a voice. The general-purpose communication device 70 may derive information indicating the loudness of a voice, or the agent device 100 may derive information indicating the loudness of a voice. Hereinafter, information indicating the loudness of a voice will be referred to as "an utterance sound pressure D1".

When the utterance sound pressure D1 is acquired by the general-purpose communication device 70 in place of the agent device 100, the general-purpose communication device 70 transmits the information of the utterance sound pressure D1 to the agent device 100. Further, the agent device 100 determines whether or not the utterance sound pressure D1 which has been transmitted from the general-purpose communication device 70 is equal to or higher than a threshold sound pressure Th1 as described below.

The agent device 100 determines whether or not the utterance sound pressure D1 is equal to or higher than the threshold sound pressure Th1 (Step S204). When the utterance sound pressure D1 is equal to or higher than the threshold sound pressure Th1, the agent device 100 causes the display/operation device 20 (a display inside the vehicle cabin) to display an agent image (Step S206). Next, the agent device 100 causes the agent to output response information using the speakers 30 (Step S208). That is, the agent device 100 is associated with the general-purpose communication device 70 and provides a service including causing an output device to output response of voice in response to a voice received by the general-purpose communication device 70. The agent device 100 is associated with the general-purpose communication device 70 and causes the display inside the vehicle cabin to display an agent in accordance with a voice equal to or higher than the threshold sound pressure Th1 received by the general-purpose communication device 70 and does not execute control for realizing an agent in the general-purpose communication device 70. Hereinafter, there are cases in which control of the agent device 100 for realizing an agent as in Step S206 and Step S208 is referred to as "normal realization control".

Figure 10:
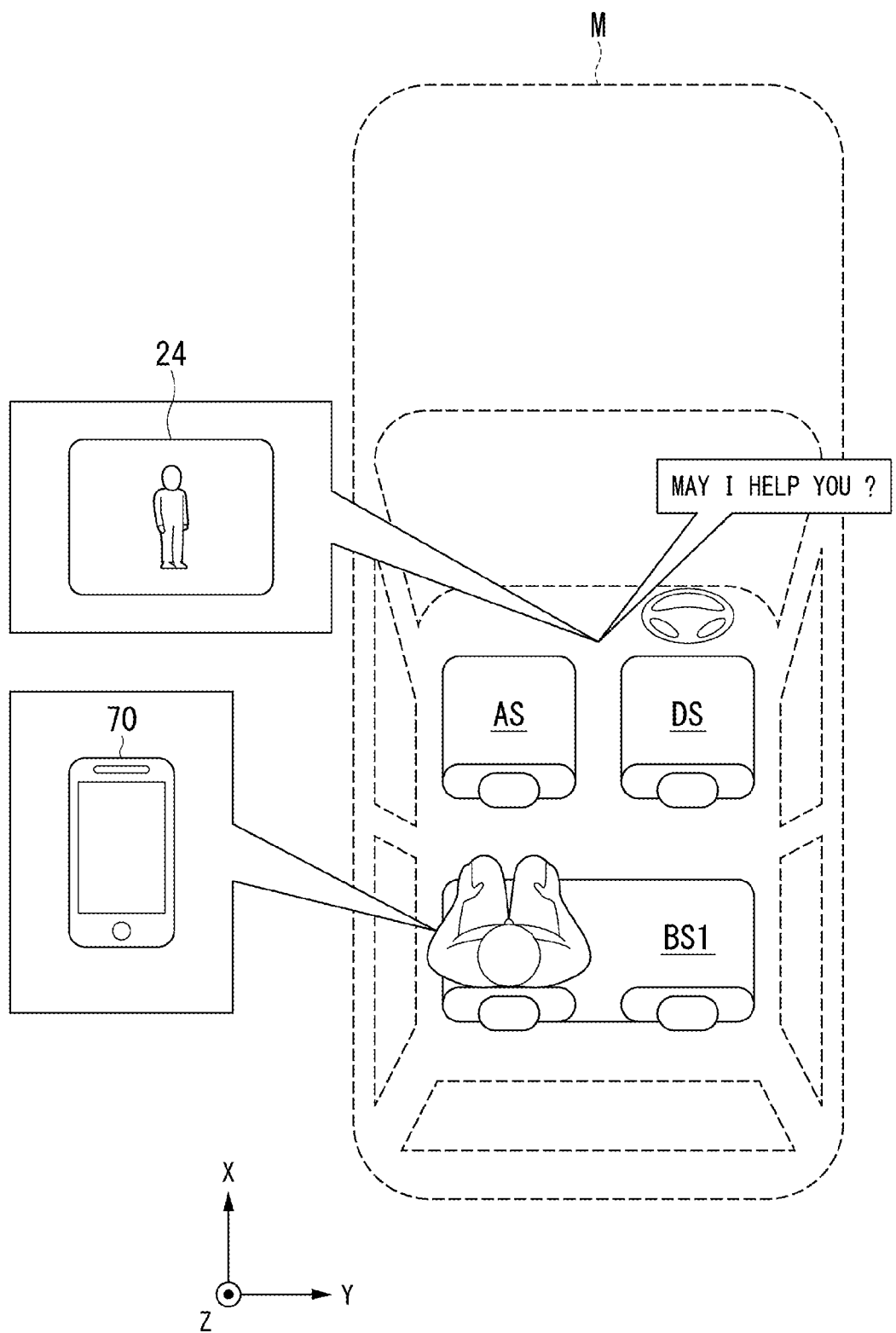
FIG. 10 is a view showing an example of a situation in which an agent is realized through normal realization control.

FIG. 10 is a view showing an example of a situation in which an agent is realized through normal realization control. In the example shown in the diagram, an agent is realized in the second display 24 and the speakers 30. In place of (addition to) the second display 24, the first display 22 may realize an agent. That is, when normal realization control is executed (when private realization control (which will be described below) is not executed), the agent device 100 causes the display inside the vehicle cabin to display an agent.

Figure 11:
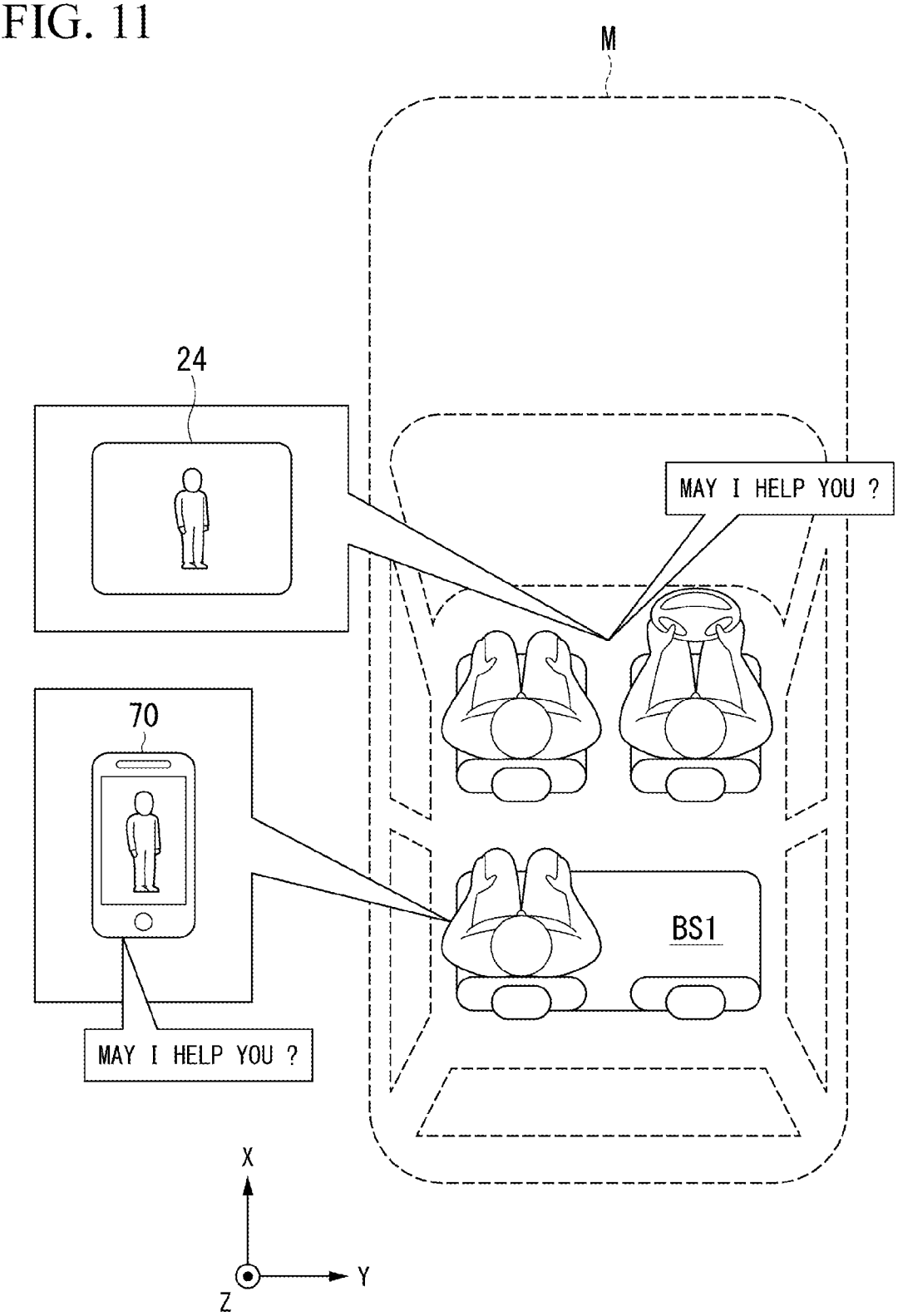
FIG. 11 is a view showing another example of a situation in which an agent is realized through normal realization control.

For example, the agent device 100 may realize an agent in the general-purpose communication device 70. In this case, the agent device 100 instructs the general-purpose communication device 70 to realize an agent. FIG. 11 is a view showing another example of a situation in which an agent is realized through normal realization control. In the example shown in the diagram, in addition to the second display 24 and the speakers 30, an agent is realized in the display 71 and the speakers 72 of the general-purpose communication device 70.

As described above, an occupant can realize an agent utilizing the general-purpose communication device 70. Therefore, convenience of the occupant is improved.

Description will return to FIG. 9. When the utterance sound pressure D1 is not equal to or higher than the threshold sound pressure Th1 (when the utterance sound pressure D1 is lower than the threshold sound pressure Th1), the agent device 100 causes the display 71 of the general-purpose communication device 70 to display an agent image (Step S210). That is, the agent device 100 causes the second display to display an agent image based on the loudness of a voice received by the external terminal receiving a vocal input. Next, the agent device 100 causes the general-purpose communication device 70 to output response information (Step S212). In other words, the agent device 100 realizes an agent through a voice from the speakers 72 of the general-purpose communication device 70. For example, the agent device 100 transmits response information, information for instructing outputting of response information, or information for instructing the display 71 to display an agent image to the general-purpose communication device 70. The general-purpose communication device 70 performs processing in Step S210 or Step S212 based on the information transmitted from the agent device 100. Hereinafter, there are cases in which control of the agent device 100 for realizing an agent in the general-purpose communication device 70 as in Step S210 and Step S212 is referred to as "private realization control (particular control)".

Figure 12:
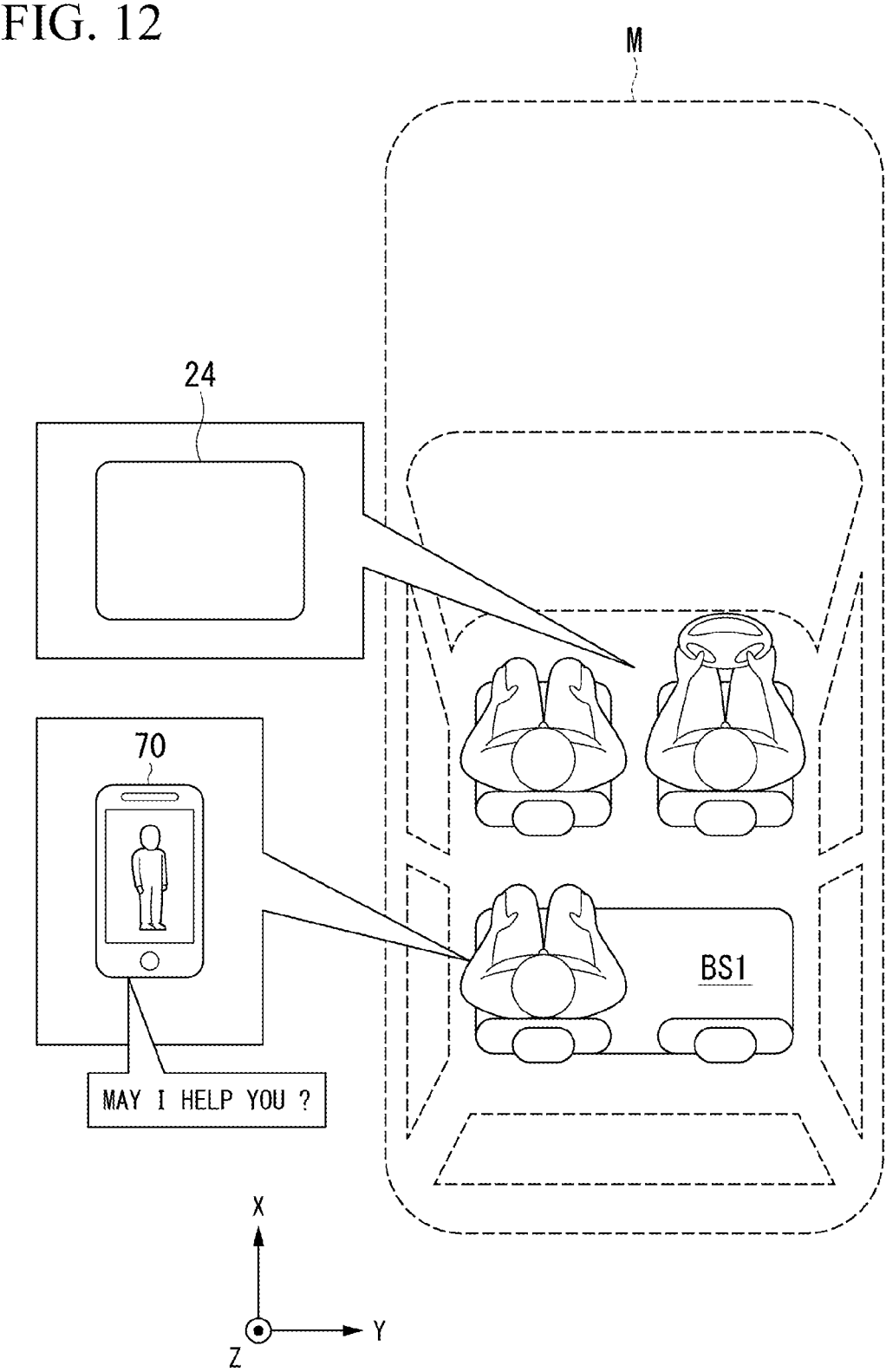
FIG. 12 is a view showing an example of a situation in which an agent is realized through private realization control.

FIG. 12 is a view showing an example of a situation in which an agent is realized through private realization control. In the example shown in the diagram, no agent is realized in the display inside the vehicle cabin and the speakers 30, and an agent is realized in the display 71 and the speakers 72 of the general-purpose communication device 70. That is, when the loudness of a voice received by the general-purpose communication device 70 is lower than the threshold sound pressure Th1, the agent device 100 executes private realization control for causing the display 71 of the general-purpose communication device 70 to display an agent image. Accordingly, the general-purpose communication device 70 executes processing for causing the display 71 to display an agent image. When the loudness of a voice received by the general-purpose communication device 70 is lower than the threshold sound pressure Th1 (when private control is executed), the agent device 100 does not cause the display inside the vehicle cabin to display an agent image.

As described above, for example, when an occupant inputs a voice to the general-purpose communication device 70 in a low voice, realization of an agent, response information, or the like can be prevented from being informed to other occupants. Therefore, an occupant can have a user-friendly agent.

As described above, after normal realization control or private realization control is executed for an agent, (1) normal realization control or private realization control may be continued, or (2) a form of realizing an agent may be decided based on a result of determining whether or not the degree of the utterance sound pressure D1 of an utterance acquired next is equal to or higher than the threshold sound pressure Th1.

For example, as in (1) described above, it is assumed that private realization control is continued. In this case, when private realization control is executed, the following particular command processing starts.

Figure 13:
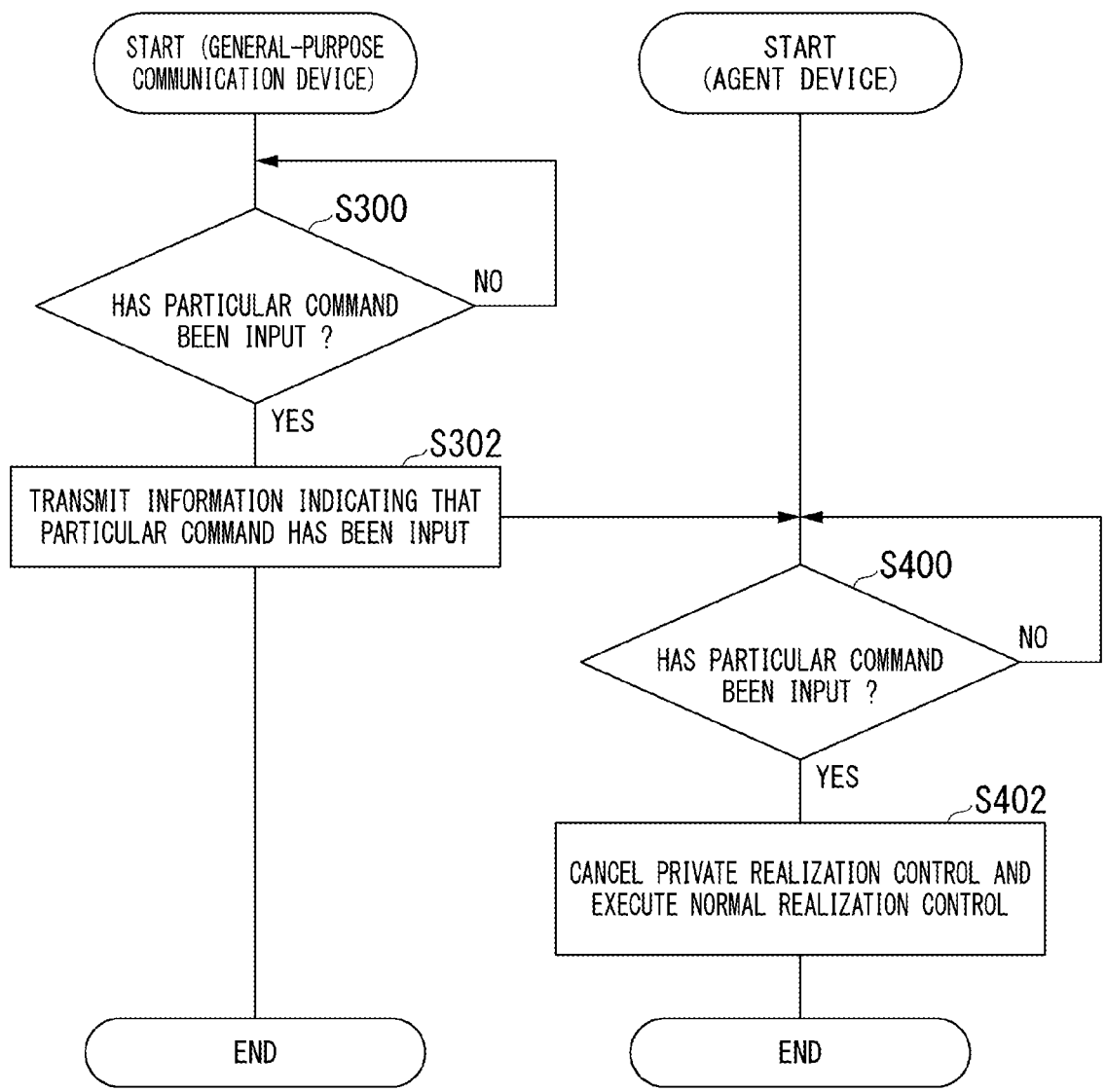
FIG. 13 is a flowchart (Part 2) showing an example of a flow of particular command processing executed by the general-purpose communication device and the agent device.

FIG. 13 is a flowchart (Part 2) showing an example of a flow of particular command processing executed by the general-purpose communication device 70 and the agent device 100. First, the general-purpose communication device 70 determines whether or not a particular command (instruction information) has been input (Step S300). For example, inputting of a particular command is executed through an input of a voice associated with the particular command or a predetermined operation with respect to the general-purpose terminal device 70. When it is determined that a particular command has been input, the general-purpose communication device 70 transmits information indicating an input of a particular command to the agent device 100 (Step S302).

Next, the agent device 100 determines whether or not a particular command has been input (Step S400). When it is determined that a particular command has been input, the agent device 100 cancels private realization control and executes normal realization control (Step S402). That is, when the general-purpose communication device 70 is caused to execute private control, the agent device 100 causes the display inside the vehicle cabin to realize an agent in accordance with a particular command transmitted from the general-purpose communication device 70. Accordingly, processing in this flowchart ends.

According to the processing described above, an agent is realized in accordance with an intention of an occupant. Therefore, satisfaction of an occupant is improved.

According to the first embodiment described above, when the loudness of a voice received by the general-purpose communication device 70 is lower than the threshold sound pressure Th1, the agent device 100 executes private control for causing the display 71 of the general-purpose communication device 70 to display an agent image, so that user-friendliness of an agent can be improved.

Second Embodiment

Hereinafter, a second embodiment will be described. In the second embodiment, in addition to determining whether or not the utterance sound pressure D1 is equal to or higher than the threshold sound pressure Th1, the agent device 100 determines whether or not an utterance of an occupant is input to the microphone 10 inside the vehicle cabin and decides the form of realizing an agent using a result of the determination. Hereinafter, differences between the first embodiment and the second embodiment will be mainly described.

Figure 14:
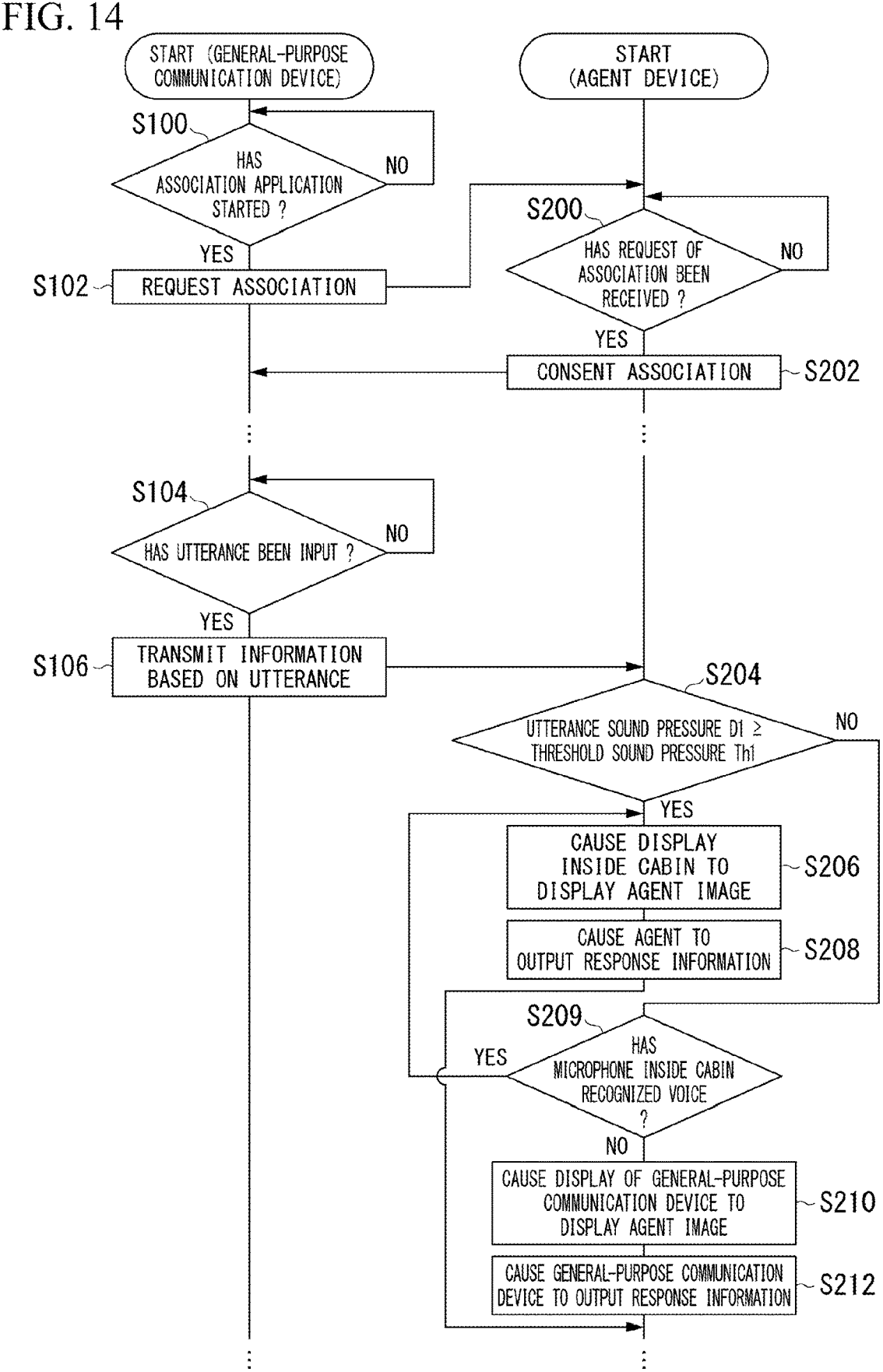
FIG. 14 is a flowchart showing an example of a flow of processing executed by a general-purpose terminal device and an agent device of a second embodiment.

FIG. 14 is a flowchart showing an example of a flow of processing executed by the general-purpose terminal device 70 and the agent device 100 of the second embodiment. Differences between this processing and the processing of the flowchart in FIG. 9 will be described.

In Step S204, when the utterance sound pressure D1 is not equal to or higher than the threshold sound pressure Th1 (when the utterance sound pressure D1 is lower than the threshold sound pressure Th1), the agent device 100 determines whether or not the microphone 10 inside the vehicle cabin has recognized a voice (Step S209). The microphone 10 inside the vehicle cabin (an example of "a receiver") may be any microphone provided inside the vehicle cabin or may be a predetermined microphone 10. For example, a predetermined microphone 10 may be a microphone provided near a seat in which an occupant who has input an utterance to the general-purpose communication device 70 is seated. For example, the agent device 100 identifies a seated position of an occupant based on a result of detection of the seat sensor of the occupant recognition device 80 and a result of communication between the general-purpose communication device 70 and the agent device 100. A result of communication indicates a direction in which the general-purpose communication device 70 is present and which is estimated based on electromagnetic waves output by the general-purpose communication device 70. The agent device 100 identifies the direction in which the general-purpose communication device 70 is present that is an output source of electromagnetic waves based on a result of reception of the electromagnetic waves output by the general-purpose communication device 70.

In Step S209, when the microphone 10 inside the vehicle cabin recognizes a voice, the process proceeds to the processing in Step S206. That is, even in a case in which the loudness of a voice received by the general-purpose communication device 70 is lower than the threshold sound pressure Th1, when the microphone 10 inside the vehicle cabin receiving an input of a voice has received a voice, the agent device 100 causes the display inside the vehicle cabin to display an agent image. In Step S209, when the microphone 10 inside the vehicle cabin has not recognized a voice, the process proceeds to the processing in Step S210.

In Step S209, in place of determining whether or not the microphone 10 inside the vehicle cabin has recognized a voice, the agent device 100 may determine whether or not the details of an utterance input by an occupant to the general-purpose communication device 70 can be recognized based on the voice acquired via the microphone 10 inside the vehicle cabin. For example, it is assumed that an occupant has input "LET ME KNOW ABOUT 00" to the general-purpose communication device 70. It is assumed that the utterance sound pressure D1 of this input utterance is lower than the threshold sound pressure Th1. In this case, when the agent device 100 acquires a voice of an utterance of an occupant via the microphone 10 inside the vehicle cabin and recognizes the details of an utterance such as "LET ME KNOW ABOUT 00" based on the acquired voice, the process proceeds to the processing in Step S206, and when the details of an utterance cannot be recognized, the process may proceed to the processing in Step S210.

For example, there are cases in which the general-purpose communication device 70 in a state in which the association application 79 has started is present at a position at a first distance from an occupant and the microphone 10 receiving a voice is present at a position at a second distance from the occupant. The first distance is a distance shorter than the second distance. In such a case, even when the occupant intends to input a voice to the microphone 10 and to execute normal realization control, there are cases in which the loudness of a voice received by the general-purpose communication device 70 is lower than the threshold sound pressure Th1 and the microphone 10 receives a voice. At this time, since the agent device 100 executes normal realization control, intended control of an occupant is realized.

According to the second embodiment described above, the agent device 100 causes the display inside the vehicle cabin to display an agent image when the microphone 10 has received a voice even in a case in which the loudness of a voice received by the general-purpose communication device 70 is lower than the threshold sound pressure Th1, so that user-friendliness of an agent can be improved.

Third Embodiment

Hereinafter, a third embodiment will be described. In the third embodiment, the agent device 100 decides the form of realizing an agent based on a voice input to a microphone provided to be used by a target occupant. Hereinafter, differences between the first embodiment, the second embodiment, and the third embodiment will be mainly described.

Figure 15:
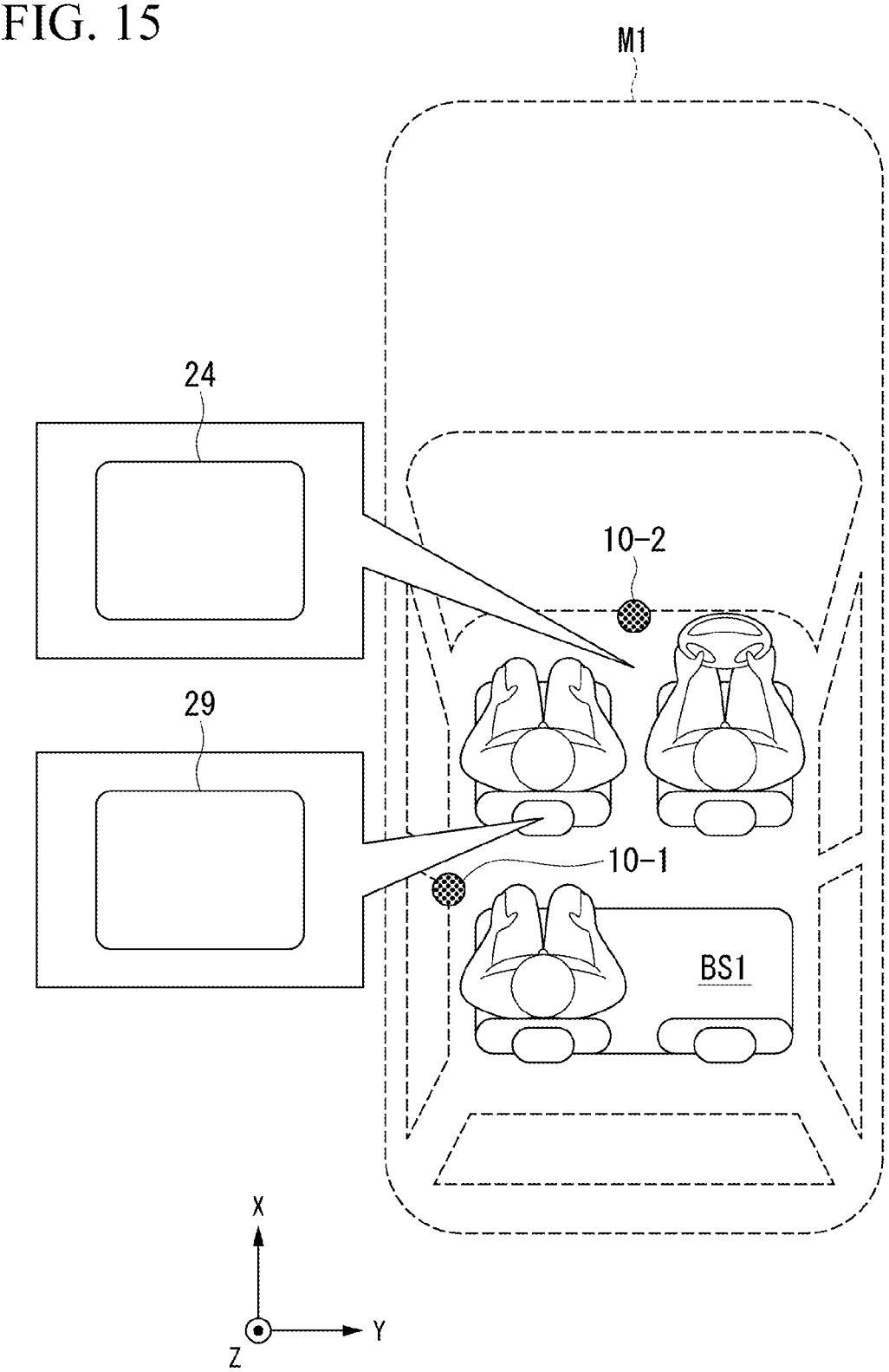
FIG. 15 is a view showing an example of disposition of a microphone and a display of a vehicle M1 of a third embodiment.

FIG. 15 is a view showing an example of disposition of the microphone 10 and the display of a vehicle M1 of the third embodiment. For example, in addition to the configurations of the functions in the first embodiment and the second embodiment, a microphone 10-1, a microphone 10-2, and a display 29 are also provided inside the vehicle cabin of the vehicle M1. The microphone 10-2 is another example of "a receiver".

The first display 22 or the second display 24 is an example of "a first display provided in a form in which a viewer is not limited". The agent device 100 or the microphone 10-1 is another example of "a first terminal receiving a vocal input". The display 29 or a different display (not shown in the diagram) is another example of "a second display provided in a form in which a viewer is limited to a user who has input a voice received by the first terminal".

The microphone 10-1 is a microphone provided to be used by a target occupant. For example, the microphone 10-1 is provided near a seat where a target occupant is seated. In the example of FIG. 15, it is assumed that an occupant is seated in the rear left seat BS2. In this case, a microphone provided in the vicinity of the rear left seat BS2 is the microphone 10-1. For example, when an occupant who is seated in the assistant driver's seat AS is a target occupant, a microphone provided in the vicinity of the assistant driver's seat AS is the microphone 10-1. For example, the microphone 10-1 is provided near a door closest to a seat where the target occupant is seated, in front of the seat where the target occupant is seated, in the ceiling above the seat where the target occupant is seated, or the like. The microphone 10-1 may be connected to the vehicle through a cable such that the microphone is brought close to the mouth of an occupant. Accordingly, an occupant can input an utterance by bringing the microphone 10-1 close to the mouth.

The microphone 10-2 is a microphone different from the microphone provided to be used by a target occupant. For example, the microphone 10-2 is provided at a place different from the place near the seat where the target occupant is seated. In the example of FIG. 15, the microphone 10-2 is provided in the vicinity of a place between the driver's seat DS and the assistant driver's seat AS in the instrument panel of the vehicle M1.

The display 29 is provided at a position where a target occupant can see the display 29, that is, a position where other occupants are unlikely to see the display 29. For example, in the example of FIG. 15, the display 29 is provided on the rear side of a backrest of the assistant driver's seat AS, that is, a position facing an occupant when the occupant is seated in the rear left seat BS2.

Figure 16:
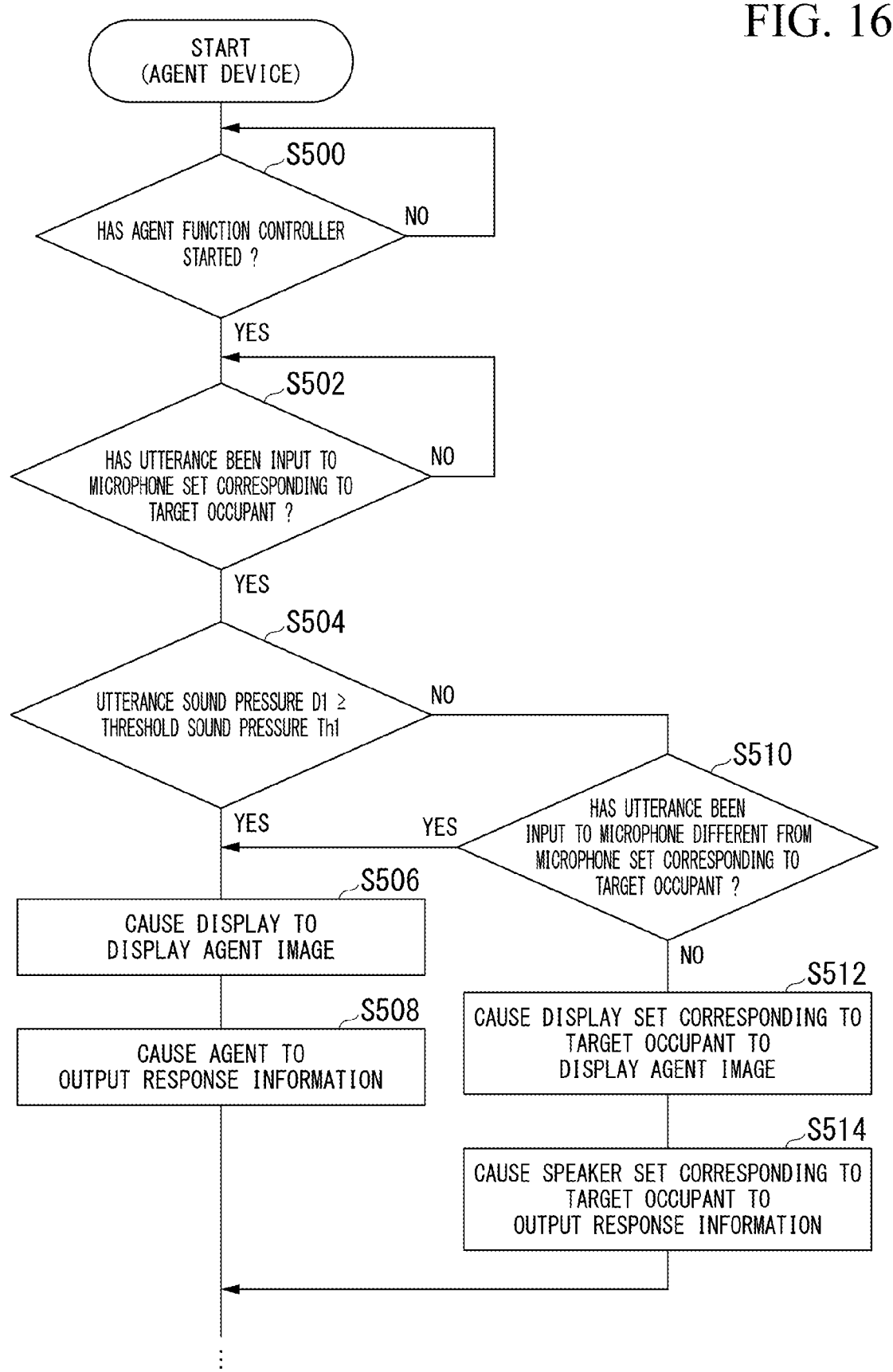
FIG. 16 is a flowchart showing an example of a flow of processing executed by an agent device of the third embodiment.

FIG. 16 is a flowchart showing an example of a flow of processing executed by the agent device 100 of the third embodiment. First, the agent device 100 determines whether or not the agent function controller 150 has started (Step S500). When the agent function controller 150 has started, the agent device 100 determines whether or not an utterance has been input to the microphone 10-1 which is set corresponding to (associated with) a target occupant (Step S502). When it is determined that an utterance has been input to the microphone 10-1, the agent device 100 determines whether or not the utterance sound pressure D1 of an input utterance is equal to or higher than the threshold sound pressure Th1 (Step S504).

When the utterance sound pressure D1 of an input utterance is equal to or higher than the threshold sound pressure Th1, the agent device 100 causes the first display 22 or the second display 24 to display an agent image (Step S506) and causes an agent to output response information using the speakers 30 (Step S508). For example, some or all of the speakers 30 are caused to realize an agent such that an occupant inside the vehicle cabin recognizes realization of the agent. The processing in Step S506 and Step S508 is another example of "normal realization control".

When the utterance sound pressure D1 is not equal to or higher than the threshold sound pressure Th1 (when the utterance sound pressure D1 is lower than the threshold sound pressure Th1), the agent device 100 determines whether or not an utterance has been input to the microphone 10-2 different from the microphone 10-1 which is set corresponding to (associated with) a target occupant (Step S510). When it is determined that an utterance has been input to the microphone 10-2, the process proceeds to the processing in Step S506.

Figure 17:
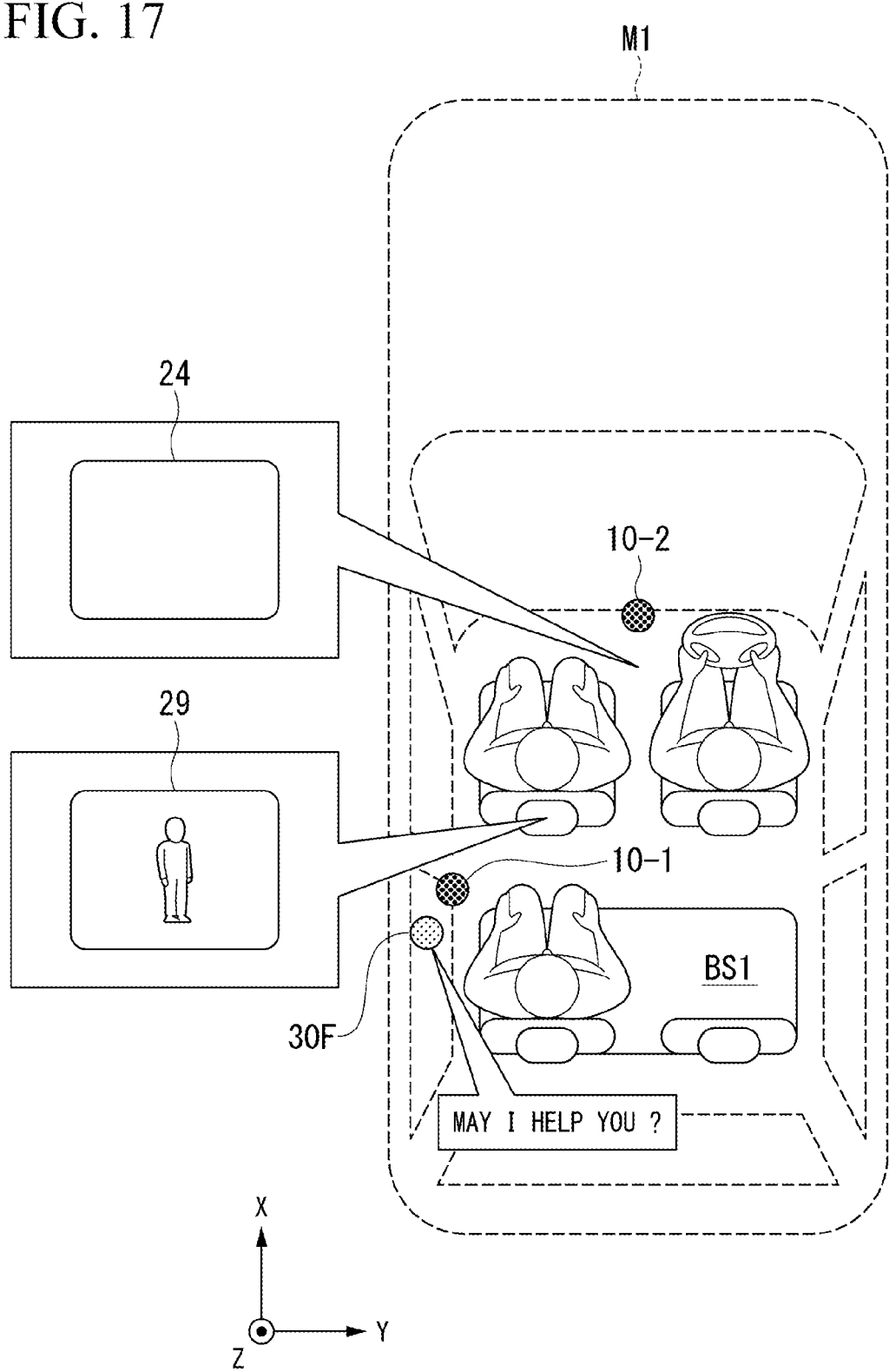
FIG. 17 is a view showing an example of a situation in which private realization control is performed in the third embodiment.

When no utterance is input to the microphone 10-2, the agent device 100 causes the display 29 to display an agent image (Step S512) and causes an agent to output response information using the speaker 30 set corresponding to (associated with) a target occupant (Step S514). For example, the speaker 30 set corresponding to (associated with) a target occupant is the speaker 30F. FIG. 17 is a view showing an example of a situation in which private realization control is performed in the third embodiment. The processing in Step S512 and Step S514 is another example of "private realization control". For example, a sound output by the speaker 30F is a sound having loudness to an extent that an occupant seated in the rear left seat BS2 can hear the sound and occupants seated in other seats cannot hear the sound. A sound output by the speaker 30F may be a sound having loudness such that the occupants seated in other seats cannot recognize the meaning of information included in the sound.

According to the third embodiment described above, even if the general-purpose communication device 70 is not used, the agent device 100 can exhibit effects similar to those in the first embodiment by deciding the form of realizing an agent based on a voice input to a microphone provided to be used by a target occupant.

Fourth Embodiment

Hereinafter, a fourth embodiment will be described. In the fourth embodiment, the agent device is provided at a position, such as occupant's home, a predetermined facility, or a predetermined position, other than a vehicle. Hereinafter, differences between the first embodiment and the fourth embodiment will be mainly described.

Figure 18:
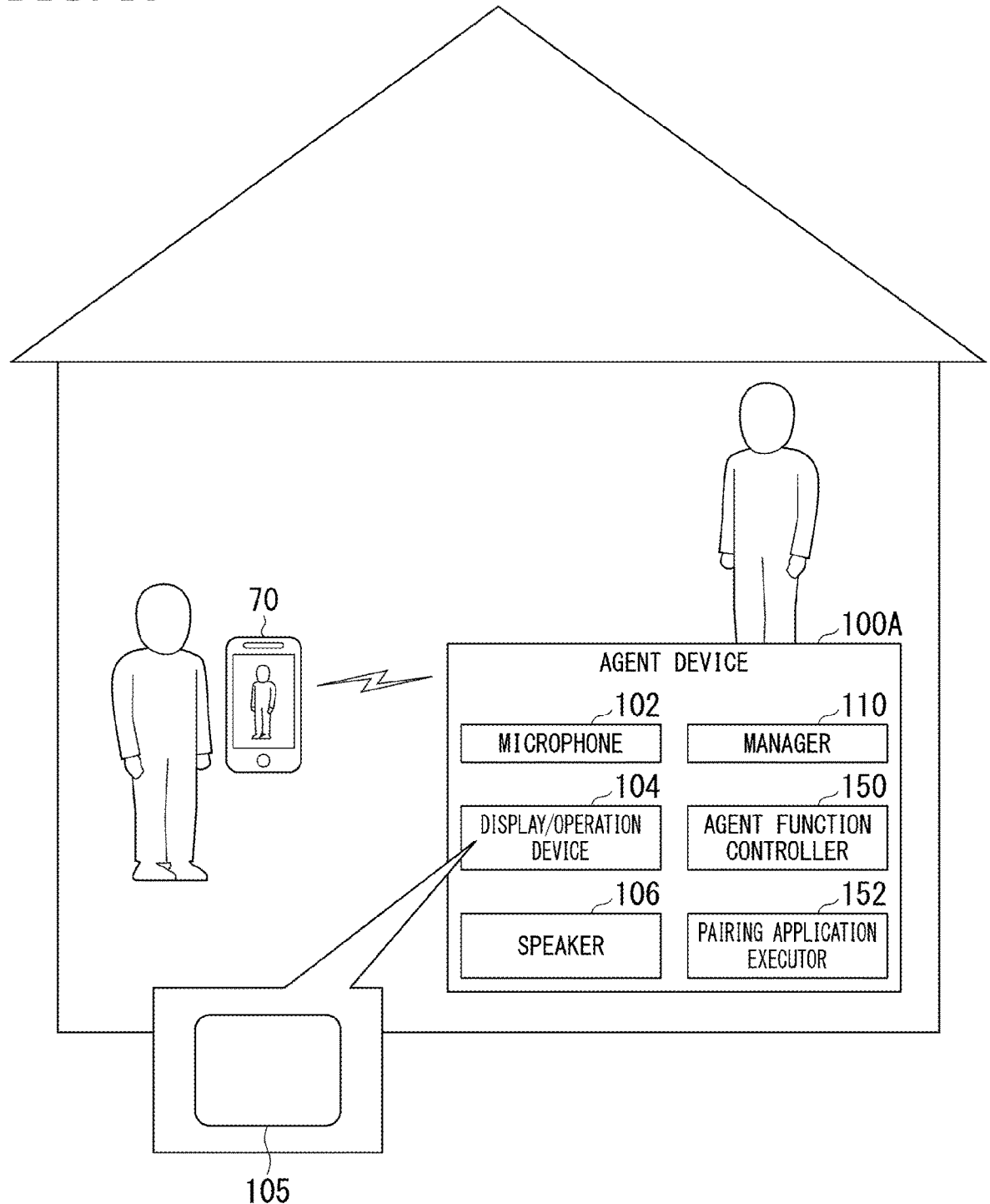
FIG. 18 is a view showing an example of an agent device provided in user's home.

FIG. 18 is a view showing an example of an agent device 100A provided in user's home. For example, the agent device 100A is a stationary device provided in occupant's home, a predetermined facility, or a predetermined position. That is, a display 105 (an example of "a first display") which will be described below and is included in the agent device 100A or a microphone 102 (another example of "a receiver") which will be described below is a stationary type provided in a facility or a predetermined position. A stationary type is based on the premise that it is movable but is used within a limited range such as inside a facility. The microphone 102 which will be described below is an example of "a receiver".

The display 105 which will be described below is another example of "a first display provided in a form in which a viewer is not limited". The general-purpose communication device 70 is an example of "a first terminal receiving a vocal input". The display 71 of the general-purpose communication device 70 or a different display (not shown in the diagram) is an example of "a second display provided in a form in which a viewer is limited to a user who has input a voice received by the first terminal".

For example, the agent device 100A includes the microphone 102, a display/operation device 104, speakers 106, the manager 110, the agent function controller 150, and the pairing application executor 152. The acoustic processor 112 performs acoustic processing with respect to a voice input to the microphone 102. The display controller 116 causes the display 105 included in the display/operation device 104 to display an image in accordance with an instruction of the agent function controller 150. The voice controller 118 causes some or all of the speakers included in the speakers 106 to output a voice in accordance with an instruction of the agent function controller 150.

When it is determined that an utterance of the occupant is input to the general-purpose communication device 70, the general-purpose communication device 70 transmits information based on an utterance to the agent device 100. The agent device 100 determines whether or not the utterance sound pressure D1 of an utterance acquired from the general-purpose communication device 70 is equal to or higher than the threshold sound pressure Th1. When the utterance sound pressure D1 is equal to or higher than the threshold sound pressure Th1, the agent device 100 causes the display 105 of the display/operation device 104 to display an agent image and causes the speakers 106 to realize an agent. That is, "normal realization control" is executed.

When the utterance sound pressure D1 is not equal to or higher than the threshold sound pressure Th1 (when the utterance sound pressure D1 is lower than the threshold sound pressure Th1), the agent device 100 causes the display 71 of the general-purpose communication device 70 to display an agent image and causes the general-purpose communication device 70 to output response information. That is, processing of "private realization control" is performed.

According to the fourth embodiment described above, even if the agent device 100 is used at a place other than a vehicle, effects similar to those in the first embodiment can be exhibited.

Fifth Embodiment

Hereinafter, a fifth embodiment will be described. In the fifth embodiment, in place of an agent device, the general-purpose communication device 70 determines whether or not the utterance sound pressure D1 is equal to or higher than the threshold sound pressure Th1 and decides the form of realizing an agent based on a result of the determination. Hereinafter, differences between the second embodiment and the fifth embodiment will be mainly described.

Figure 19:
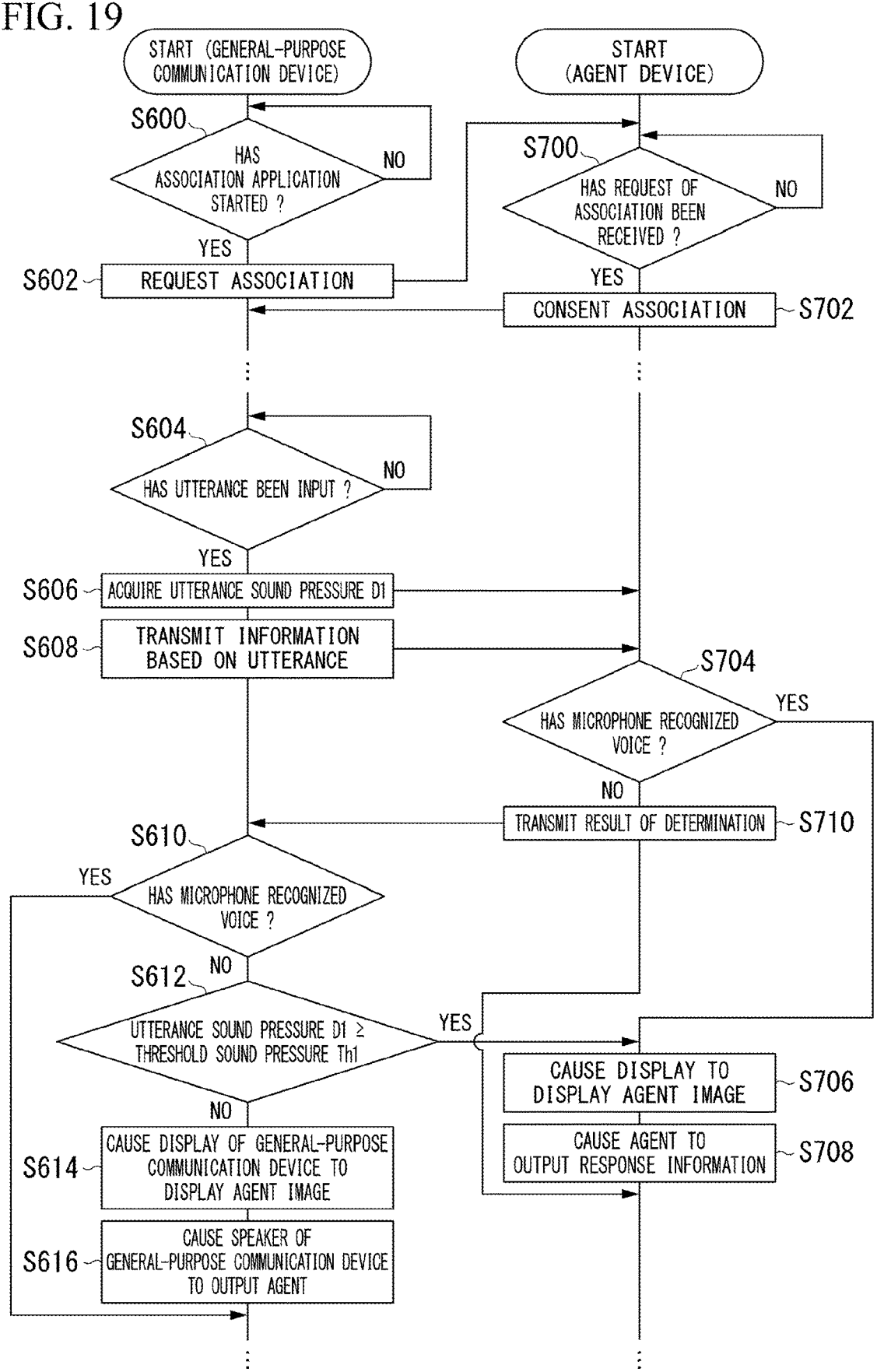
FIG. 19 is a flowchart showing an example of a flow of processing executed by a general-purpose terminal device and the agent device.

FIG. 19 is a flowchart showing an example of a flow of processing executed by the general-purpose terminal device 70 and the agent device 100. Since the processing in Steps S600 to S604, Step S700, and S702 in FIG. 19 is similar to the processing in Steps S100 to S104, Step S200, and Step S202 in FIG. 9, description thereof will be omitted.

When it is determined that an utterance of the occupant is input in Step S604, the general-purpose communication device 70 acquires the utterance sound pressure D1 of an input utterance (Step S606). Next, the general-purpose communication device 70 transmits information based on an utterance to the agent device 100 (Step S608).

The agent device 100 determines whether or not the microphone 102 has recognized a voice (Step S704). When the microphone 102 has recognized a voice, the agent device 100 causes the display inside the vehicle cabin to display an agent image (Step S706) and causes an agent to output response information using the speakers 30 (Step S708). That is, "normal realization control" is executed.

When the microphone 102 has recognized no voice, the agent device 100 transmits a result of the determination in Step S704 to the general-purpose communication device 70 (Step S710). For example, in Step S710, in addition to a result of the determination in Step S704, response information is also transmitted to the general-purpose communication device 70. After the information transmitted in Step S608 is acquired, the agent device 100 acquires response information in accordance with the acquired information from the agent server 200.

The general-purpose communication device 70 determines whether or not the microphone 102 has recognized a voice based on a result of the determination transmitted in Step S710 (Step S610). When the microphone 102 has recognized a voice, the process skips the processing in Steps S612 to S616.

The microphone 102 has recognized no voice, the general-purpose communication device 70 determines whether or not the utterance sound pressure D1 is equal to or higher than the threshold sound pressure Th1 (Step S612). When the utterance sound pressure D1 is equal to or higher than the threshold sound pressure Th1, the general-purpose communication device 70 transmits an output instruction to the agent device 100, and the agent device 100 performs processing in Steps S706 and S708.

When the utterance sound pressure D1 is not equal to or higher than the threshold sound pressure Th1 (when the utterance sound pressure D1 is lower than the threshold sound pressure Th1), the general-purpose communication device 70 causes the display 71 of the general-purpose communication device 70 to display an agent image (Step S614) and causes an agent to output response information using the speakers 72 of the general-purpose communication device 70 (Step S616). That is, "private realization control" is executed.

According to the fifth embodiment described above, the general-purpose communication device 70 determines whether or not the utterance sound pressure D1 is equal to or higher than the threshold sound pressure Th1, so that a processing load in the agent device 100 is reduced.

Some of the functions of each of the foregoing embodiments may be included in other devices, some of the processing of each of the foregoing flowcharts may be omitted, and the order of each process of the processing may be switched. The processing or the configuration of the function of each of the embodiments may be applied in combination.

Hereinabove, forms for performing the present invention have been described using the embodiments. However, the present invention is not limited to the embodiments, and various modifications and replacements can be applied within a range not departing from the gist of the present invention.

What is claimed is:

1. An agent device comprising:
a display controller configured to cause a first display to display an agent image when an agent providing a service including causing an output device to output response of voice in response to an utterance of a user is activated; and
a controller configured to execute particular control for causing a second display to display the agent image according to loudness of a voice received by an external terminal receiving a vocal input.

2. The agent device according to claim 1,
wherein the controller is configured to perform the particular control for the second display when the loudness of a voice received by the external terminal receiving a vocal input is lower than predetermined loudness.

3. The agent device according to claim 1,
wherein the second display is included in the external terminal.

4. The agent device according to claim 1,
wherein the display controller does not cause the first display to display the agent image when the controller executes particular control.

5. The agent device according to claim 1,
wherein the display controller is configured to cause the first display to display the agent image when the controller does not execute particular control.

6. The agent device according to claim 1,
wherein the controller is configured to cause the first display to display the agent image when a receiver receiving an input of a voice has received a voice even in a case in which the loudness of a voice received by the external terminal is lower than predetermined loudness.

7. The agent device according to claim 6,
wherein the receiver is a stationary microphone provided in a vehicle, in a facility, or at a predetermined position.

8. The agent device according to claim 1,
wherein the first display is a stationary display provided in a vehicle, in a facility, or at a predetermined position.

9. The agent device according to claim 1,
wherein the external terminal is a portable terminal device.

10. The agent device according to claim 1,
wherein the display controller is configured to cause the first display to display the agent image in accordance with instruction information transmitted from the external terminal when the controller executes the particular control.

11. The agent device according to claim 1,
wherein the agent device is associated with the external terminal, and wherein the agent is configured to provide a service including causing an output device to output response of voice in response to a voice received by the external terminal.

12. The agent device according to claim 1,
wherein the agent device is associated with the external terminal,
wherein the display controller is configured to cause the first display to display the agent image in accordance with a voice at predetermined loudness or louder received by the external terminal, and
wherein the controller does not execute the particular control in accordance with a voice at predetermined loudness or louder received by the external terminal.

13. An agent device comprising:
a display controller configured to cause a first display provided in a form in which a viewer is not limited to display an agent image when an agent providing a service including causing an output device to output response of voice in response to an utterance of a user is activated; and
a controller configured to execute particular control for causing a second display provided in a form in which a viewer is limited to a user who has input a voice received by a first terminal to display an agent image when loudness of a voice received by the first terminal receiving a vocal input is lower than predetermined loudness.

14. An agent system comprising:
a storage medium configured to store an application program executed by a computer causing
a receiver receiving a vocal input to receive a voice,
an agent device to transmit information according to a voice received by the receiver, and
a first particular display to realize an agent image according to an instruction of particular control acquired from the agent device in accordance with information according to the transmitted voice; and
the agent device configured to include
a display controller which is configured to cause a second particular display to display an agent image when an agent providing a service including causing an output device to output response of voice in response to an utterance of a user is activated, and
a controller which is configured to cause the computer to execute the particular control for causing the second particular display to display the agent image when loudness of a voice received by the receiver is lower than predetermined loudness.

* * * * *